(12) United States Patent
Ding et al.

(10) Patent No.: US 12,537,052 B2
(45) Date of Patent: Jan. 27, 2026

(54) MEMORIES, OPERATION METHODS THEREOF AND MEMORY SYSTEMS

(71) Applicant: Yangtze Memory Technologies Co., Ltd., Hubei (CN)

(72) Inventors: Ling Ding, Hubei (CN); ShiYang Yang, Hubei (CN); Yong Fu, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 21 days.

(21) Appl. No.: 18/614,153

(22) Filed: Mar. 22, 2024

(65) Prior Publication Data

US 2025/0182815 A1 Jun. 5, 2025

(30) Foreign Application Priority Data

Nov. 30, 2023 (CN) .......................... 202311641199.1
Jan. 16, 2024 (CN) .......................... 202410063419.5

(51) Int. Cl.
*G11C 11/4093* (2006.01)
*G11C 11/4076* (2006.01)
*G11C 11/4096* (2006.01)

(52) U.S. Cl.
CPC ...... *G11C 11/4093* (2013.01); *G11C 11/4076* (2013.01); *G11C 11/4096* (2013.01)

(58) Field of Classification Search
CPC ............ G11C 11/4093; G11C 11/4076; G11C 11/4096
USPC ................................................... 365/189.011
See application file for complete search history.

(56) References Cited

U.S. PATENT DOCUMENTS

| | | | |
|---|---|---|---|
| 2011/0205824 A1* | 8/2011 | Kajigaya | G11C 7/1006 365/219 |
| 2015/0269986 A1* | 9/2015 | Fujisawa | G11C 7/1048 365/189.05 |

* cited by examiner

*Primary Examiner* — Connie C Yoha
(74) *Attorney, Agent, or Firm* — HANLEY, FLIGHT & ZIMMERMAN, LLC

(57) ABSTRACT

Memories, operation methods and memory systems are provided. An example memory includes M memory banks and a peripheral circuit including a control signal synthesis circuit and a first read register. The control signal synthesis circuit includes input terminals and a first output terminal. each input terminal is connected with one corresponding memory bank and the first output terminal is connected with the first read register. The control signal synthesis circuit is configured to receive control signals through input terminals and output an overall control signal through the first output terminal. A path from each input terminal to the first output terminal in the control signal synthesis circuit has a same length. The first read register is configured to receive the overall control signal and data read from at least one of the M memory banks and output the read data based on the overall control signal.

20 Claims, 20 Drawing Sheets

US 12,537,052 B2

MEMORIES, OPERATION METHODS THEREOF AND MEMORY SYSTEMS

CROSS REFERENCE TO RELATED APPLICATION

This application claims priority to and the benefit of Chinese Patent Application 202311641199.1, filed on Nov. 30, 2023 and Chinese Patent Application 202410063419.5, filed on Jan. 16, 2024, which are hereby incorporated by reference in their entirety.

TECHNICAL FIELD

Implementations of the present disclosure relate to the field of semiconductor technology and in particular, but not limited to, memory, operation methods thereof and memory systems.

BACKGROUND

With a continuous development of science and technology nowadays, semiconductor devices are widely used in various electronic apparatus and products. For example, a dynamic random access memory (DRAM) is a type of nonvolatile memory that is a common semiconductor memory device used in computers.

BRIEF DESCRIPTION OF DRAWINGS

In figures, the same reference numerals indicate the same or like components or elements throughout a plurality of figures, unless otherwise specified. The figures are not necessarily drawn to scale. It should be understood that the figures only depict some implementations in accordance with the present disclosure and should not be considered as limitation on the scope of the present disclosure.

DETAILED DESCRIPTION

Figure 1:
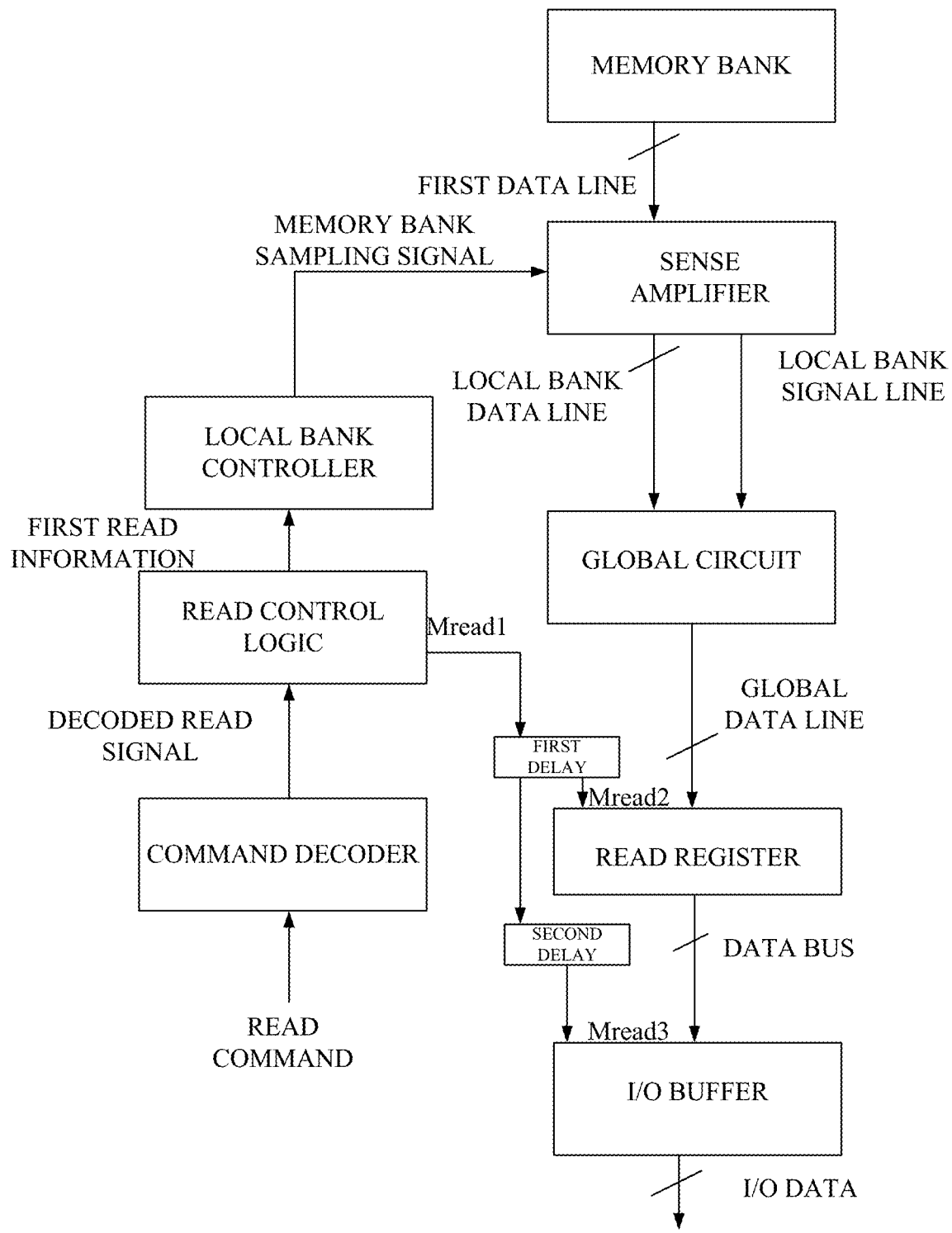
FIG. 1 is a schematic flow chart illustrating a process of outputting read data from a memory bank to a read register in some implementations.

For ease of understanding of the present disclosure, example implementations of the present disclosure will be described in more detail with reference to relevant accompanying drawings. Although example implementations of the present disclosure are illustrated in accompanying drawings, it should be understood that the present disclosure can be embodied in various forms and is not limited to specific implementations described herein. On the contrary, the implementations are provided for more thorough understanding of the present disclosure and to convey the scope of the present disclosure fully to those skilled in the art.

In the description hereafter, many specific details are provided to facilitate more thorough understanding of the present disclosure. However, it is apparent for those skilled in the art that the present disclosure can be implemented without one or more of these details. In some implementations, to avoid obscuring the present disclosure, some technical features well known in the art will not be described. That is to say, not all features of practical implementations will be described herein, and well-known functions and structures may not be described in detail.

Generally, terms should be understood at least in part from the usage in their contexts. For example, the term "one or more", as used herein, may be used to describe any feature, structure, or characteristic in a singular sense or may be used to describe combinations of features, structures or characteristics in a plural sense, depending at least in part upon context. Similarly, terms, such as "a," "an," or "the," again, may be understood to convey a singular usage or to convey a plural usage, depending at least in part upon context. In addition, it should be understood that the term "based on" is not necessarily intended to convey an exclusive set of factors and may, instead, allow for existence of additional factors not necessarily described expressly, also depending at least in part on context.

Term is used herein only for description of specific implementations and in no way for limiting the present disclosure, unless defined otherwise. As used herein, the terms "a", "an" and "the" in singular forms are also intended to cover plural forms, unless the context clearly indicates otherwise. It is also appreciated that terms "comprise", "comprising", "include" and/or "including", as used in the specification, specify presence of the mentioned features, integers, steps, operations, elements and/or components, but do not exclude presence or addition of one or more other features, integers, steps, operations, elements, components and/or combinations thereof. As used herein, the term "and/ or" includes any and all combinations of relevant listed items.

For facilitating thorough understanding of the present disclosure, detailed steps and structures will be provided in the following description to set forth solutions of the present disclosure. Detailed description of example implementations of the present disclosure is as follows, however the present disclosure may have other implementations in addition to the detailed description.

How to improve performance of DRAM has become an issue to be solved.

In some implementations, as shown in FIG. 1, a memory receives a read command from outside (e.g., from a host), and a command decoder in a peripheral circuit of the memory receives and decodes the read command to obtain a decoded read signal. The decoded read signal may be expressed by data of 1 bit, and may be represented in the form of a pulse. For example, a high pulse represents a decoded read signal and, if two read commands are received, two decoded read signals, i.e. two high pulse signals, will be generated. A read control logic receives and combines at least one decoded read signal, and determines a pattern of the at least one decoded read signal (e.g., X8 or X16) to output a first read information. A local bank controller receives the first read information, and also decodes address information in the read command, and outputs a memory bank sampling signal dl_oen that, in contrast to the decoded read signal, further includes an address of the memory bank to be read.

The data read from the memory bank to be read are transferred through a first data line to a sense amplifier. The memory bank sampling signal dl_oen acts on the sense amplifier corresponding to the memory bank to be read, and the sense amplifier will output the data read from the corresponding memory bank through a local bank data line as a data line used by a single memory bank, when the memory bank sampling signal dl_oen is active. Meanwhile, a control signal LBDL_RD is output through a local bank signal line. The control signal LBDL_RD and the read data enter a global circuit (e.g., a global data line access circuit) together. The read data is sampled by using the control signal LBDL_RD, and the global circuit outputs global data through a global data line as a data line used commonly by a plurality of memory banks. However, respective lengths of the global data lines connected with different memory banks are different. Global data will enter a read register (RREG), and a sampling signal for the global data is from a first asynchronous sampling signal Mread1 output by the read control logic. The read register receives the global data and outputs DQ_RD data when the first asynchronous sampling signal Mread1 is active. In some implementations, the first asynchronous sampling signal Mread1 may be obtained by delaying the decoded read data with a first delay. The first delay may be predetermined.

Figure 2:
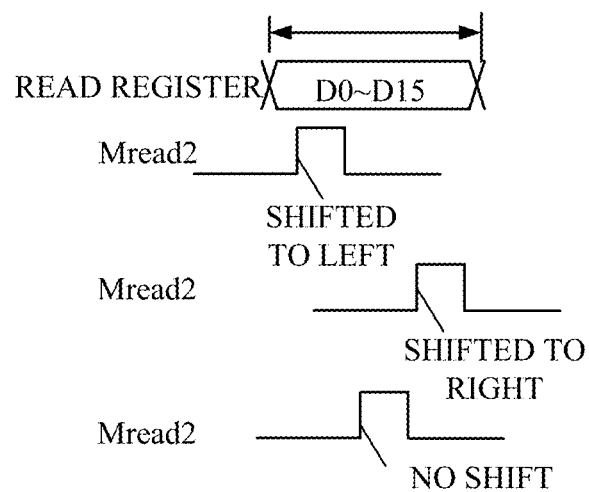
FIG. 2 is a schematic diagram illustrating sampling of data in a read register using a second asynchronous sampling signal Mread2 in some implementations.

As shown in FIG. 2, the actually resulting first delay may deviate in time from the set first delay due to deviation of process corner and variation in process, voltage and temperature in the production process, which may cause some deviation in time between the ultimately resulting second asynchronous sampling signal Mread2 and the target second asynchronous sampling signal Mread2. For example, the second asynchronous sampling signal Mread2 may come earlier (shifted to the left), which may cause sampling of an edge of global data or even sampling of the previous global data, resulting in a sampling error. For another example, the second asynchronous sampling signal Mread2 may come late (shifted to the right), which may cause a narrower read window or even sampling of the next global data, resulting in a sampling error. In summary, the operation of generating the second asynchronous sampling signal Mread2 from the first asynchronous sampling signal Mread1 output by the read control logic may cause incapability of strict timing match between the second asynchronous sampling signal Mread2 and the global data.

The read register receives global data and outputs DQ_RD data when the second asynchronous sampling signal Mread2 is active. Furthermore, the DQ_RD data will enter an input/output buffer, and be converted into input/output (I/O) data of 8 bits for a pad region when a third asynchronous sampling signal Mread3 is active. That is to say, one pad region includes 8 I/O ports. It can be understood that one pad region may further include any other number of I/O ports. The present disclosure is not limited in this aspect.

In some implementations, the third asynchronous sampling signal Mread3 may be obtained by delaying the second asynchronous sampling signal Mread2 with a second delay. The second delay may be predetermined. The actually resulting second delay may deviate in time from the set second delay due to deviation of process corner and variation in process, voltage and temperature in the production process, which may cause some deviation in time between the ultimately resulting third asynchronous sampling signal Mread3 and the target third asynchronous sampling signal Mread3, resulting in the problem of timing mismatch between the DQ_RD data and the third asynchronous sampling signal Mread3 upon sampling of the DQ_RD data output by the read register.

Figure 3:
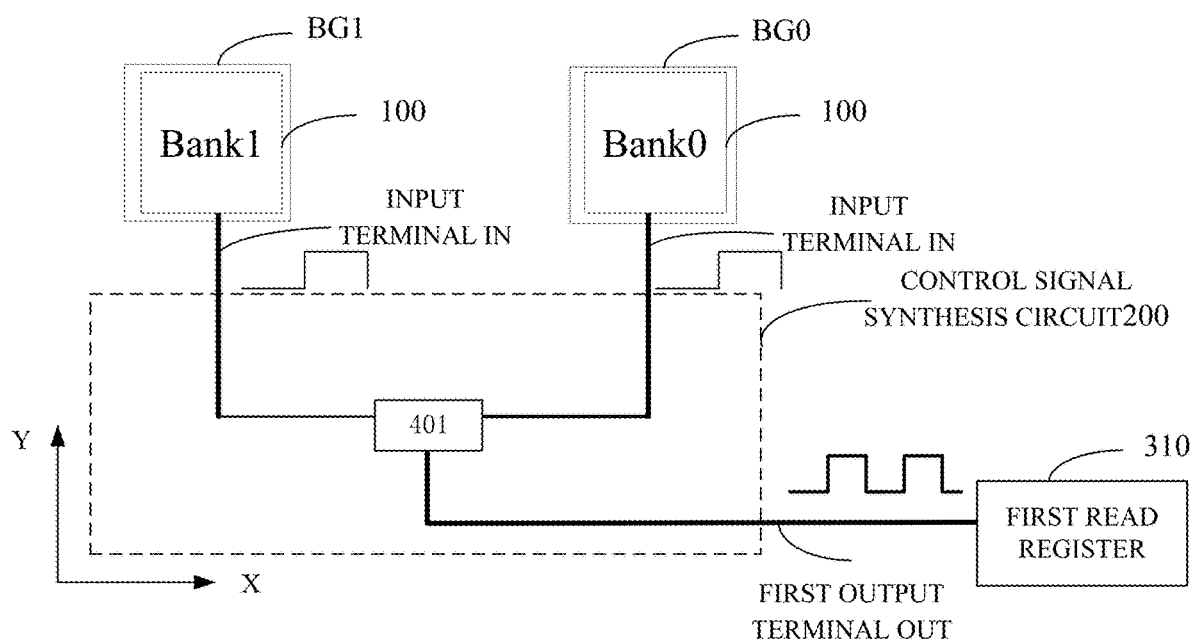
FIG. 3 is a first schematic diagram of a control signal synthesis circuit provided in an implementation of the present disclosure.
Figure 4:
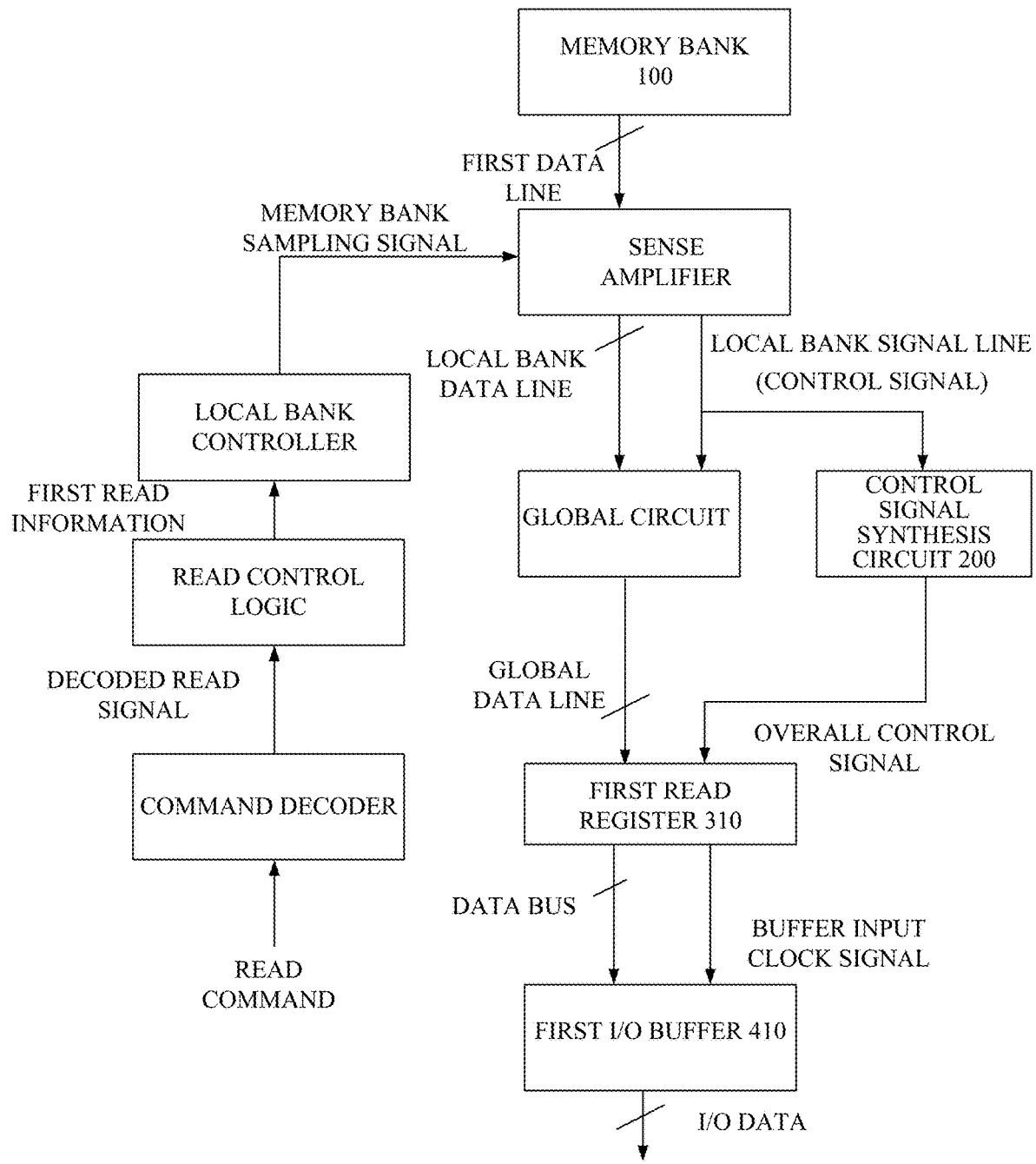
FIG. 4 is a schematic flow chart illustrating a process of outputting read data from a memory bank to a read register in an implementation of the present disclosure.

In order to solve one or more of the problems above, with reference to FIGS. 3 and 4, implementations of the present disclosure provide a memory including M memory banks 100. M is an integer larger than 1. The memory further includes a peripheral circuit including a control signal synthesis circuit 200 and a first read register 310. The control signal synthesis circuit 200 includes a plurality of input terminals IN and a first output terminal OUT. Each input terminal is connected with one corresponding memory bank 100, and the first output terminal OUT is connected with the first read register 310. The control signal synthesis circuit 200 is configured to receive a plurality of control signals, and output an overall control signal through the first output terminal. The path from each input terminal IN to the first output terminal OUT in the control signal synthesis circuit 200 has the same length. The first read register 310 is configured to receive the data read from at least one of the M memory banks 100 and output the read data based on the overall control signal.

Implementations of the present disclosure are suitable for, but not limited to, dynamic random access memory (DRAM) and static random access memory (SRAM). Here, DRAM includes, but not limited to, double data rate SDRAM (DDR) and low power DDR (LPDDR). DDR further includes DDR4, DDR5, DDR6 and so on. LPDDR further includes LPDDR4, LPDDR5, LPDDR6 and so on.

With reference to FIGS. 3 and 4, the memory may include a plurality of memory banks 100, for example, Bank0 and Bank1. Each memory bank 100 may include memory cells for data storage, which can be accessed by controlling word lines and bit lines.

In implementations of the present disclosure, the plurality of input terminals IN in the control signal synthesis circuit 200 have the same number as the plurality of memory banks 100 in the memory and are in one-to-one correspondence with the memory banks 100 in the memory. Each memory bank 100 is connected with one corresponding sense amplifier through a first data line. Each sense amplifier outputs read data through a local bank data line and meanwhile also outputs a control signal LBDL_RD through a local bank signal line. Each input terminal IN of the control signal synthesis circuit 200 receives a corresponding control signal LBDL_RD, and outputs an overall control signal at the first output terminal of the control signal synthesis circuit 200. The date wiring lines between the plurality of memory banks 100 and the first read register 310 are omitted in FIG. 3, but it can be understood that no matter the data wiring lines between the memory banks 100 and the first read register 310 are longer or shorter, the lengths of corresponding signal lines are the same, ensuring that the read data to the first read register 310 is sampled correctly by the overall control signal.

With reference to FIG. 4, in implementations of the present disclosure, the data read from the memory bank 100 to be read is transferred through a first data line to a sense amplifier. The sense amplifier will output the data read from the corresponding memory bank 100 through a local bank data line and output a control signal LBDL_RD through a local bank signal line, when the memory bank sampling signal dl_oen is active. The control signal LBDL_RD and the read data enter a global circuit. The read data is sampled by the control signal LBDL_RD. The global circuit outputs global data through a global data line. The control signal synthesis circuit 200 outputs an overall control signal by using a plurality of control signals. The global data enter the first read register 310, which will output DQ_RD data when the overall control signal is active. The overall control signal is delayed a period of time to generate a buffer input clock signal FIFO_IN. DQ_RD data enters the first I/O buffer 410, which will output I/O data when the buffer input clock signal FIFO_IN is active.

In some implementations, data read from the memory bank 100 each time may be data of 128 bits, and the first I/O buffer outputs data of 8 bits each time and may repeat the output operation 16 times, to output the data of 128 bits read from the memory bank 100 one time to outside.

In implementations of the present disclosure, a control signal synthesis circuit 200 is disposed between a plurality of memory banks 100 and a first read register 310, and has a plurality of input terminals IN configured to receive a plurality of control signals and a first output terminal to output an overall control signal. Since the length of the path from each input terminal to the first output terminal in the control signal synthesis circuit 200 is the same, the control signals corresponding to different memory banks can arrive at the first read register at the same time, so that the read data received by the first read register can be sampled neither too early nor too late by the overall control signal.

Figure 5:
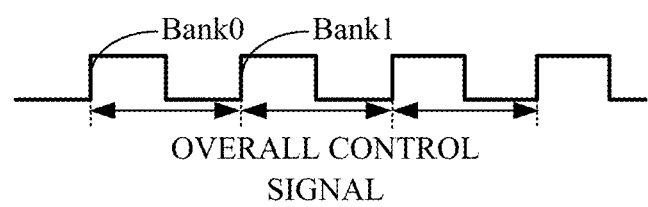
FIG. 5 is a schematic diagram of an overall control signal provided in an implementation of the present disclosure.

With reference to FIGS. 3 and 5, the time for the control signal LBDL_RD corresponding to Bank0 to arrive at the first output terminal is the same as the time for the control signal LBDL_RD corresponding to Bank1 to arrive at the first output terminal. With the assumption that the control signal LBDL_RD corresponding to Bank0 is issued earlier and the control signal LBDL_RD corresponding to Bank1 is issued later (the present disclosure has no limitation on the sequence, in which the control signals issued by the individual banks), the control signal synthesis circuit 200 synthesizes the above-mentioned two control signals into an overall control signal, with the first pulse of the overall control signal corresponding to the control signal LBDL_RD for Bank0, and the second pulse of the overall control signal corresponding to the control signal LBDL_RD for Bank1. It can be understood that more pulses may be further included before the first pulse in FIG. 5.

In implementations of the present disclosure, during transferring the data read from the memory banks 100 to the first read register 310, each stage of circuits that the data passes through is provided with a sampling signal, ensuring that the data can be sampled correctly at each stage.

Figure 6:
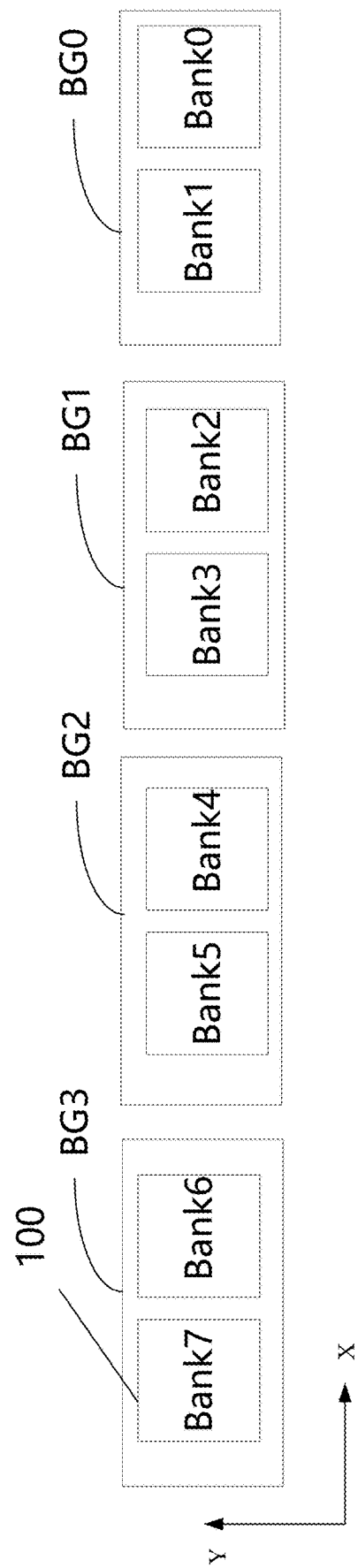
FIGS. 6 and 7 are schematic diagrams illustrating arrangement of memory bank groups provided in implementations of the present disclosure.
Figure 7:
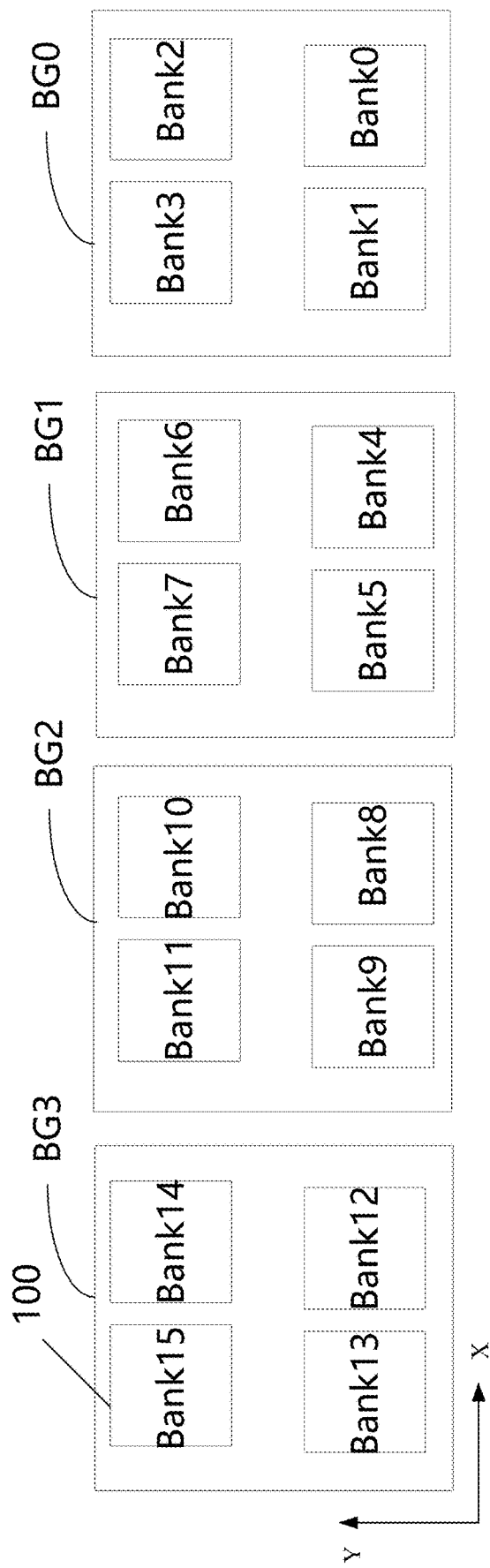

In some implementations, as shown in FIGS. 6 and 7, a memory includes a plurality of bank groups (BG), each of which includes N memory banks 100. The plurality of bank groups are arranged in a first direction. N is an integer smaller than M.

Refer to FIG. 6, FIG. 6 shows that the memory includes 8 memory banks 100, wherein every two adjacent memory banks constitute one bank group. Bank0 and Bank1 constitute BG0, Bank2 and Bank3 constitute BG1, Bank4 and Bank5 constitute BG2, and Bank6 and Bank7 constitute BG3.

Refer to FIG. 7, FIG. 7 shows that the memory includes 16 memory banks 100 arranged as an array in a first direction and a second direction. Here, every two columns of memory banks adjacent in the first direction constitute one bank group. Bank0, Bank1, Bank2 and Bank3 constitute BG0, Bank4, Bank5, Bank6 and Bank7 constitute BG1, Bank8, Bank9, Bank10 and Bank11 constitute BG2, and Bank12, Bank13, Bank14 and Bank15 constitute BG3.

Here, the first direction may be the X direction and the second direction may be the Y direction in the figures of the present disclosure.

It can be understood that the numbers of the memory banks 100 in the memory of the implementations above are only examples, and the present disclosure has no limitation on the number of the memory banks 100.

In some implementations, the control signal synthesis circuit 200 includes m stages of synthesis units with m being an integer larger than or equal to 1. The control signal synthesis circuit 200 is configured to generate an mth control signal through synthesis by an mth-stage synthesis unit. The mth control signal is an overall control signal.

In implementations of the present disclosure, the m stages of synthesis units can be configured to correspond to the plurality of memory banks 100 of the memory in number. Generally, the higher the number of the memory banks 100 of the memory, the higher the number m of stages of the synthesis units in the control signal synthesis circuit 200 is. That is to say, the number m of stages of the synthesis units is in positive correlation with the number of the memory banks 100.

In some implementations, the control signal synthesis circuit 200 includes a first-stage synthesis unit. The first-stage synthesis unit includes a plurality of input terminals, and the control signal synthesis circuit 200 is configured to synthesize, by the first-stage synthesis unit, the control signals corresponding respectively to the 2N memory banks 100 in adjacent bank groups into a first control signal.

In an implementation of the present disclosure, only one control signal corresponding to one memory bank 100 among the plurality of control signals corresponding to the plurality of memory banks 100 in one bank group is active at a timing.

In an implementation of the present disclosure, the control signal synthesis circuit 200 includes at least the first-stage synthesis unit. For example, the control signal synthesis circuit will be described below in connection with FIG. 3 and FIGS. 8-13.

In some implementations, the control signal synthesis circuit 200 includes a first-stage synthesis unit. With reference to FIG. 3, each bank group includes one memory bank 100, wherein BG1 includes Bank1 and BG0 includes Bank0. The first-stage synthesis unit 401 includes two input terminals receiving the control signals corresponding to BG1 and BG0 respectively and synthesize the control signals into a first control signal. It can be understood that, in the implementation shown in FIG. 3, the first control signal is an overall control signal.

In some implementations, the control signal synthesis circuit 200 is configured to synthesize, by a kth-stage synthesis unit, the (k−1)th control signals, which are generated through synthesis respectively by two (k−1)th-stage synthesis units adjacent in the first direction, into a kth control signal. K is an integer larger than 1 and smaller than or equal to m.

Figure 8:
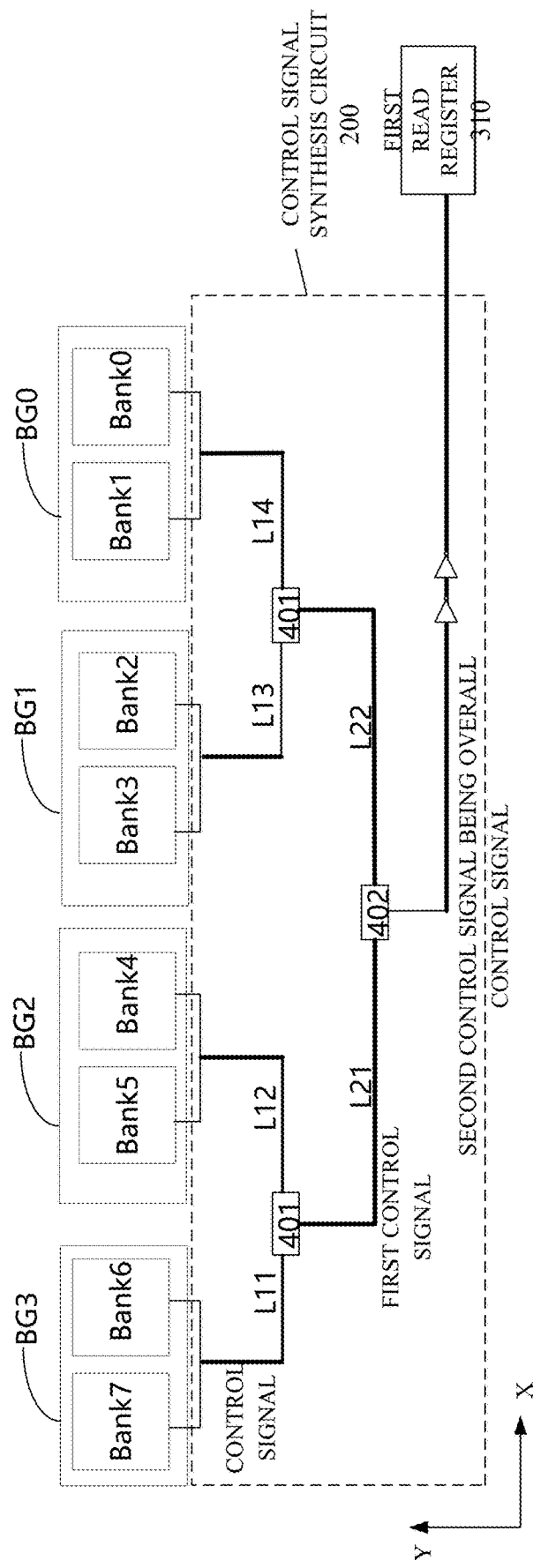
FIG. 8 is a second schematic diagram of a control signal synthesis circuit provided in an implementation of the present disclosure.

In some implementations, the control signal synthesis circuit 200 includes a first-stage synthesis unit 401 and other stage synthesis units. With reference to FIG. 8, two adjacent memory banks constitute one bank group. Bank0 and Bank1 constitute BG0, Bank2 and Bank3 constitute BG1, Bank4 and Bank5 constitute BG2, and Bank6 and Bank7 constitute BG3. The control signal synthesis circuit 200 includes a first-stage synthesis unit 401 and a second-stage synthesis unit 402. The implementation as shown in FIG. 8 includes two first-stage synthesis units and one second-stage synthesis unit. The first-stage synthesis unit synthesizes the control signals corresponding respectively to the four memory banks 100 in adjacent bank groups (BG0 and BG1, or BG2 and BG3) into a first control signal, and the second-stage synthesis unit 402 synthesizes the first control signals, generated through synthesis respectively by two first-stage synthesis units adjacent in the first direction, into a second control signal. Here, the second control signal is an overall control signal.

In some implementations, as shown in FIG. 8, a driver (e.g., an inverter) is also included between the first output terminal of the control signal synthesis circuit 200 and the first read register 310 to drive the overall control signal output by the control signal synthesis circuit 200. FIG. 8 illustratively shows a driver including two inverters. However, implementations of the present disclosure have no limitation on the number of the inverters. In some implementations, the driver may include an even number of inverters.

In some implementations, the kth-stage synthesis unit is located on the mid-perpendicular line of two (k−1)th-stage synthesis units adjacent in the first direction.

With reference to FIG. 8, the control signal synthesis circuit 200 includes two first-stage synthesis units 401, each of which includes an OR gate. Each first-stage synthesis unit 401 is located on the mid-perpendicular line of adjacent bank groups; and for example, the first first-stage synthesis unit 401 is located on the mid-perpendicular line of BG3 and BG2, and the second first-stage synthesis unit 401 is located on the mid-perpendicular line of BG1 and BG0. The first first-stage synthesis unit 401 and the second first-stage synthesis unit 401 are arranged in the first direction. The second-stage synthesis unit 402 includes an OR gate and is located on the mid-perpendicular line of the two first-stage synthesis units 401.

In some implementations, the length of the path for each (k−1)th control signal to be transferred from the corresponding (k−1)th-stage synthesis unit to the corresponding kth-stage synthesis unit is the same.

It can be understood that, in an implementation of the present disclosure, each kth-stage synthesis unit is located on the mid-perpendicular line of two (k−1)th-stage synthesis units adjacent in the first direction, so that it can be more convenient to design the wiring lines between the kth-stage synthesis units and the (k−1)th-stage synthesis units. For example, as shown in FIG. 8, the wiring lines between the adjacent first-stage synthesis units and the second-stage synthesis unit are arranged symmetrically with respect to the mid-perpendicular line of the adjacent first-stage synthesis units, so that the length of the path for each (k−1)th control signal to be transferred from the corresponding (k−1)th-stage synthesis unit to the corresponding kth-stage synthesis unit is the same.

With reference to FIG. 8, the length of the path for the control signal corresponding to BG3 from BG3 to the first first-stage synthesis unit 401 is L11, the length of the path for the control signal corresponding to BG2 from BG2 to the first first-stage synthesis unit 401 is L12, and L11 is equal to L12. The length of the path for the control signal corresponding to BG1 from BG1 to the second first-stage synthesis unit 401 is L13, the length of the path for the control signal corresponding to BG0 from BG0 to the second first-stage synthesis unit 401 is L14, and L13 is equal to L14. In an implementation of the present disclosure, the memory banks are arranged at an equal interval in the first direction, so that L11=L12=L13=L14. The length of the path from the first first-stage synthesis unit 401 to the second-stage synthesis unit 402 is L21, the length of the path from the second first-stage synthesis unit 401 to the second-stage synthesis unit 402 is L22, and L21 is equal to L22.

For BG3, the length of the path, along which the corresponding control signal passes through the control signal synthesis circuit 200, is the sum of L11 and L21. For BG2, the length of the path, along which the corresponding control signal passes through the control signal synthesis circuit 200, is the sum of L12 and L21. For BG1, the length of the path, along which the corresponding control signal passes through the control signal synthesis circuit 200, is the sum of L13 and L22. For BG0, the length of the path, along which the corresponding control signal passes through the control signal synthesis circuit 200, is the sum of L14 and L22. It can be seen that the paths, along which control signals corresponding to the individual bank groups pass through the control signal synthesis circuit 200, have the same length, i.e. the control signals have the same delay time that is determined by the length of the path from the input terminal IN to the first output terminal OUT in the control signal synthesis circuit 200.

Figure 9:
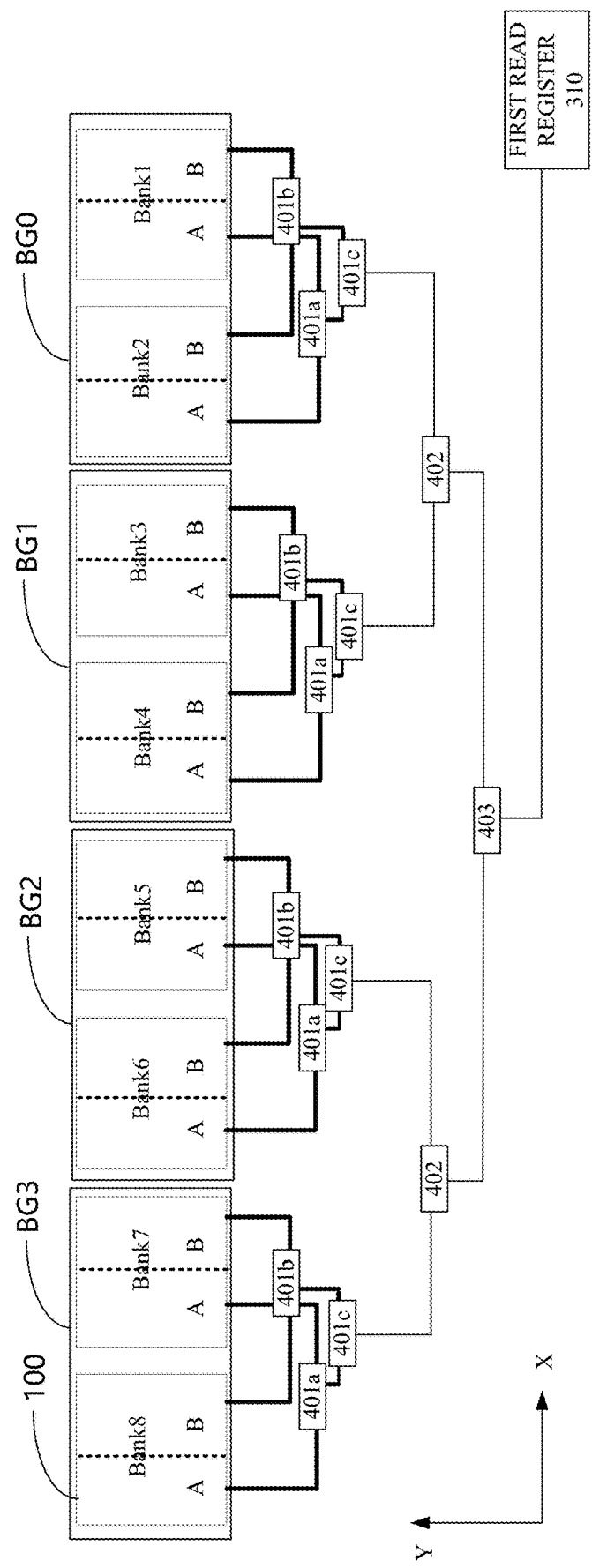
FIG. 9 is a third schematic diagram of a control signal synthesis circuit provided in an implementation of the present disclosure.

In some implementations, with reference to FIG. 9, each memory bank 100 includes a first sub memory bank (BankA) and a second sub memory bank (BankB). The control signal corresponding to each memory bank 100 includes a first sub control signal corresponding to the first sub memory bank (BankA) and a second sub control signal corresponding to the second sub memory bank (BankB). Each first-stage synthesis unit 401 includes a first sub synthesis unit 401a, a second sub synthesis unit 401b, and a third sub synthesis unit 401c.

In an implementation of the present disclosure, each memory bank 100 may be divided into a first sub memory bank (BankA) and a second sub memory bank (BankB). The control signal corresponding to each memory bank 100 can be divided into a first sub control signal and a second sub control signal. The first sub control signal and the second sub control signal are independent from each other and thus have no interference therebetween, so that the first sub memory bank and the second sub memory bank can be controlled separately. When the first sub control signal is active, the data read from the first sub memory bank (BankA) can be sampled into a global circuit and when the second sub control signal is active, the data read from the second sub memory bank (BankB) can be sampled into the global circuit.

In some implementations, by using the first sub synthesis unit 401a, the second sub synthesis unit 401b and the third sub synthesis unit 401c, a plurality of first sub control signals corresponding to a plurality of first sub memory banks and a plurality of second sub control signals corresponding to a plurality of second sub memory banks are synthesized into at least one first control signal.

For example, with reference to FIG. 9, the control signal synthesis circuit 200 may be configured to: synthesize the first sub control signals corresponding respectively to N first sub memory banks in a bank group into a third sub control signal by the first sub synthesis unit 401a; synthesize the second sub control signals corresponding respectively to N second sub memory banks in a bank group into a fourth sub control signal by the second sub synthesis unit 401b; and synthesize the third sub control signal and the fourth sub control signal corresponding to one bank group into a first control signal by the third sub synthesis unit 401c.

In an implementation of the present disclosure, the third sub control signal and the fourth sub control signal received by the same third sub synthesis unit 401c are from the same bank group.

Figure 10:
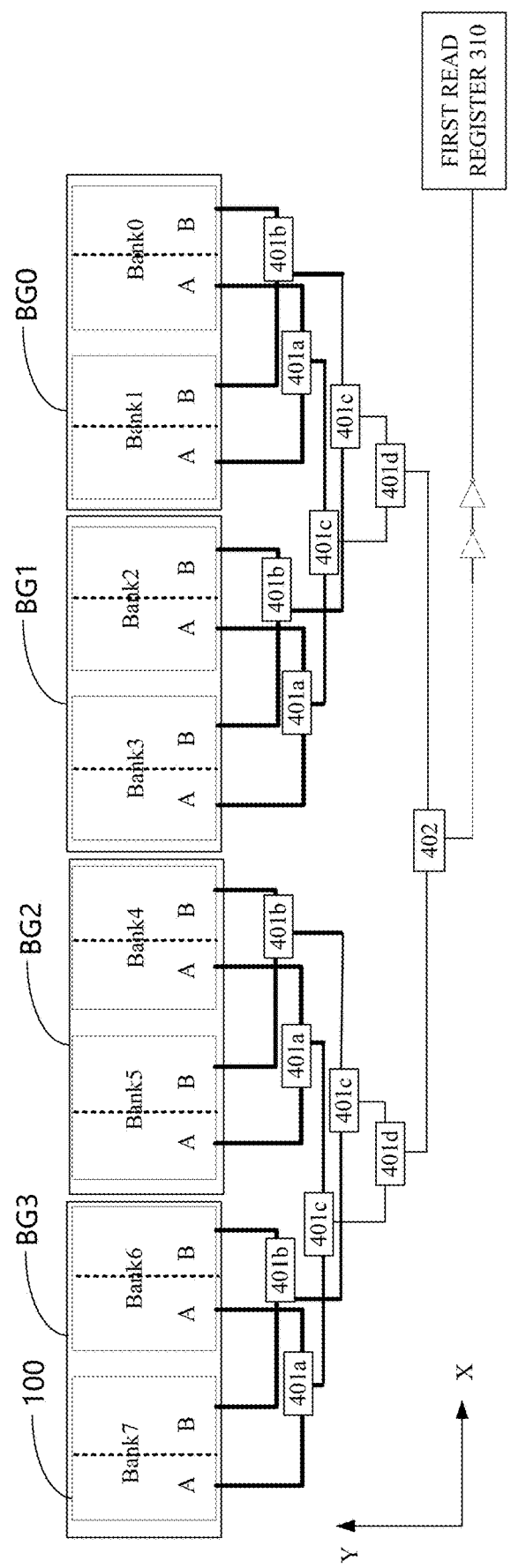
FIG. 10 is a fourth schematic diagram of a control signal synthesis circuit provided in an implementation of the present disclosure.

With reference to FIG. 10, in some implementations, each first-stage synthesis unit 401 further includes a fourth sub synthesis unit 401d, and the control signal synthesis circuit 200 is configured to: synthesize the first sub control signals corresponding respectively to N first sub memory banks in a bank group into a third sub control signal by a first sub synthesis unit 401a; synthesize the second sub control signals corresponding respectively to N second sub memory banks in a bank group into a fourth sub control signal by a second sub synthesis unit 401b; synthesize the third sub control signals, generated through synthesis respectively by two first sub synthesis units 401a adjacent in the first direction, into a fifth sub control signal by a third sub synthesis unit 401c, and synthesize the fourth sub control signals, generated through synthesis respectively by two second sub synthesis units 401b adjacent in the first direction, into a sixth sub control signal by a third sub synthesis unit 401c; and synthesize the fifth sub control signal and the sixth sub control signal, generated through synthesis respectively by two third sub synthesis units 401c adjacent in the first direction, into a first control signal by the fourth sub synthesis unit 401d.

The first sub synthesis unit 401a and the second sub synthesis unit 401b here have the same functions as those in the implementation shown in FIG. 9 and will not be described repeatedly here.

The implementation shown in FIG. 10 is different from the implementation shown in FIG. 9 in that each third sub synthesis unit 401c synthesizes the third sub control signals, generated through synthesis by two first sub synthesis units 401a adjacent in the first direction, into a fifth control signal or synthesizes the fourth sub control signals, generated through synthesis by two second sub synthesis units 401b adjacent in the first direction, into a sixth control signal. Then the fourth sub synthesis unit 401d synthesizes the fifth sub control signal and the sixth sub control signal, generated through synthesis respectively by two third sub synthesis units 401c adjacent in the first direction, into a first control signal. However, the number of stages of synthesis units that the implementation shown in FIG. 10 has is less than that of the implementation shown in FIG. 9 by one.

The implementations shown in FIG. 9 and FIG. 10 illustrate an example way, in which a first sub control signal corresponding to a first sub memory bank and a second sub control signal corresponding to a second sub memory bank are synthesized into a first control signal when each memory bank 100 includes the first sub memory bank and the second sub memory bank. It should be understood that the way of generating the first control signal is not limited to this.

In some implementations, the number of the kth-stage synthesis units is one half of the number of the (k−1)th-stage synthesis units.

The kth-stage synthesis units are configured to synthesize the signals output by the adjacent (k−1)th-stage synthesis units. It can be understood that the number of the kth-stage synthesis units is one half of the number of the (k−1)th-stage synthesis units.

In some implementations, m stages of synthesis units include OR gates.

In an implementation of the present disclosure, the m stages of synthesis units include the first-stage synthesis unit 401 to the mth-stage synthesis unit. When m is 1, the first-stage synthesis unit 401, i.e. the mth-stage synthesis unit, may include one OR gate. When m is 2, the first-stage synthesis unit 401 may include a plurality of OR gates and the second-stage synthesis unit, i.e. the mth-stage synthesis unit, may include one OR gate. When m is 3 or larger, the first-stage synthesis unit 401 may include a plurality of OR gates, the second-stage synthesis unit may include a plurality of OR gates, . . . , and the mth-stage synthesis unit may include one OR gate.

Figure 11:
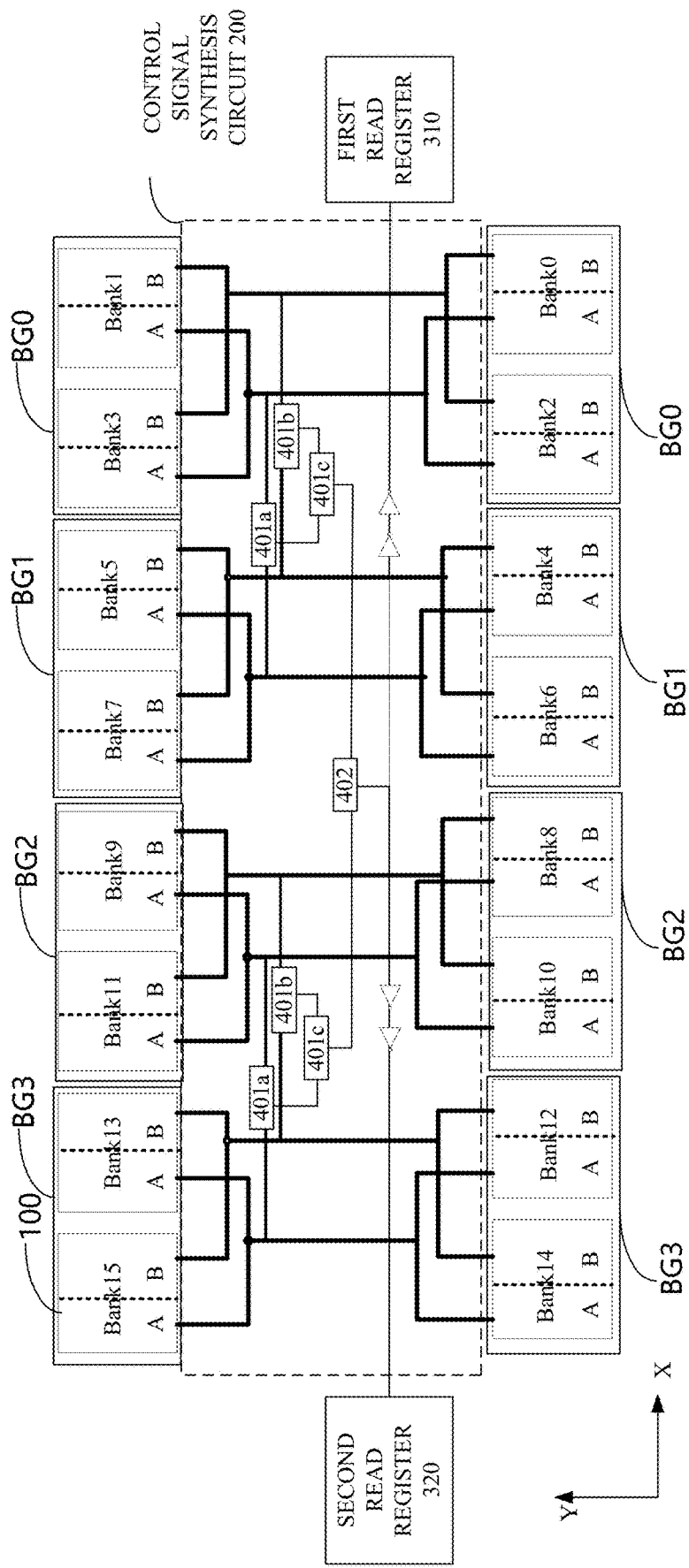
FIG. 11 is a fifth schematic diagram of a control signal synthesis circuit provided in an implementation of the present disclosure.

In some implementations, with reference to FIG. 11, M memory banks 100 are disposed on the two sides of a peripheral circuit in the second direction. The m stages of synthesis units, a first read register 310 and/or a second read register 320 are in a region, in which the peripheral circuit is located. The even numbered memory banks 100 (e.g., Bank0, Bank2, . . . , Bank14) are on the first side of the peripheral circuit in the second direction (Y direction), and the odd numbered memory banks 100 (e.g., Bank1, Bank3, . . . , Bank15) are on the second side of the peripheral circuit in the second direction (Y direction). The first side and the second side are opposite in the Y direction. Also, in FIG. 11, Bank0 to Bank3 may constitute BG0, Bank4 to Bank7 may constitute BG1, Bank8 to Bank11 may constitute BG2, and Bank12 to Bank15 may constitute BG3.

In some other implementations, with reference to FIG. 8, FIG. 9 and FIG. 10, M memory banks 100 are located on one side of the peripheral circuit in the second direction that is perpendicular to the first direction.

The m stages of synthesis units, the first read register 310 and/or the second read register 320 are in the region, in which the peripheral circuit is located. All memory banks 100 are located on the same side of the peripheral circuit in the Y direction.

Figure 12:
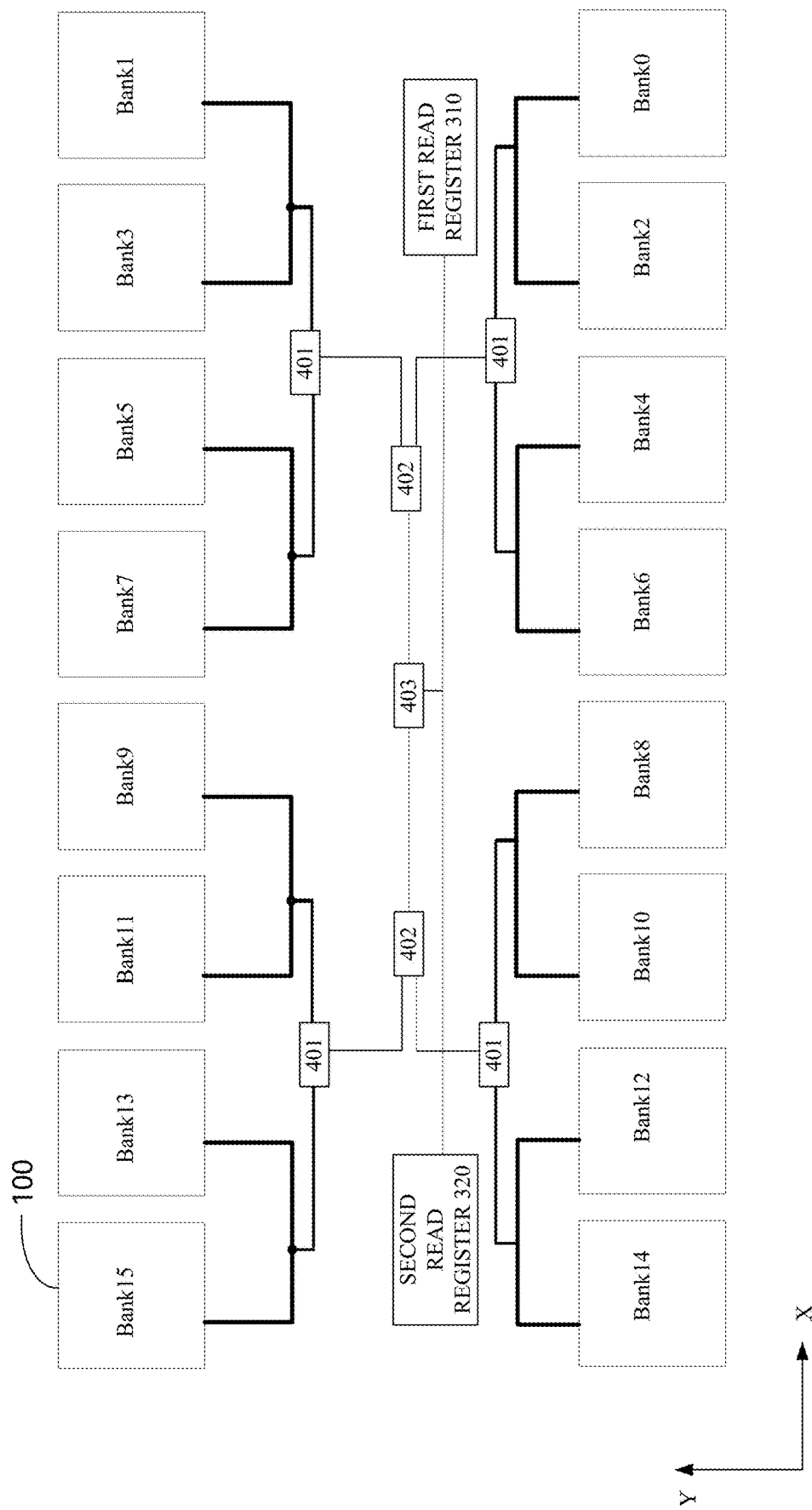
FIG. 12 is a sixth schematic diagram of a control signal synthesis circuit provided in an implementation of the present disclosure.

In some implementations, with reference to FIGS. 11 and 12, the peripheral circuit further includes the second read register 320, and the first read register 310 and the second read register 320 are disposed respectively on the two sides of the M memory banks 100 in the first direction. The second output terminal of the control signal synthesis circuit 200 is connected with the second read register 320. The length of the path from each input terminal to the second output terminal in the control signal synthesis circuit 200 is the same; and the second read register 320 is configured to receive the data read from at least one of the M memory banks 100 and output the read data based on the overall control signal.

In FIG. 12, Bank0 and Bank2 may constitute BG0, Bank1 and Bank3 may constitute BG1, Bank4 and Bank6 may constitute BG2, Bank5 and Bank7 may constitute BG3, Bank8 and Bank10 may constitute BG4, Bank9 and Bank11 may constitute BG5, Bank12 and Bank14 may constitute BG6, and Bank13 and Bank15 may constitute BG7.

In an implementation of the present disclosure, the second read register 320 and the first read register 310 may be located on the mid-perpendicular line of two memory banks adjacent in the second direction. The distance between the first read register 310 and the mth-stage synthesis unit in the first direction is h1, and the distance between the second read register 320 and the mth-stage synthesis unit in the first direction is h2 with h1 being equal to h2. In some implementations, with reference to FIG. 11, the projections of the first read register 310 and the second read register 320 in the X direction may not overlap the projection of a plurality of bank groups in the X direction. In some other implementations, with reference to FIG. 12, in order to reduce the length of the wiring line between the first output terminal of the control signal synthesis circuit 200 and the first read register 310 and the length of the wiring line between the second output terminal of the control signal synthesis circuit 200 and the second read register 320, the projections of the first read register 310 and the second read register 320 in the X direction may at least partially overlap the projection of the plurality of bank groups in the X direction.

In some implementations, when the memory is in the X16 mode, the data read from a plurality of first sub memory banks (BankA) of the M memory banks are output to the second read register 320, and the data read from a plurality of second sub memory banks (BankB) of the M memory banks are output to the first read register 310. Alternatively, when the memory is in the X16 mode, the data read from the plurality of first sub memory banks (BankA) of the M memory banks are output to the first read register 310, and the data read from the plurality of second sub memory banks (BankB) of the M memory banks are output to the second read register 320.

In some implementations, when the memory is in the X8u mode, the data read from the M memory banks 100 is output to the first read register 310, and when the memory is in the X81 mode, the data read from the M memory banks 100 is output to the second read register 320.

In some implementations, when the memory is in the X8u mode, the data read from the M memory banks 100 is output to the second read register 320, and when the memory is in the X81 mode, the data read from the M memory banks 100 is output to the first read register 310.

When the overall control signal is active, the data stored in the first read register 310 and the second read register 320, i.e., the data read from at least one of the M memory banks 100, is output to the next stage of circuits (e.g., an I/O buffer).

Figure 13:
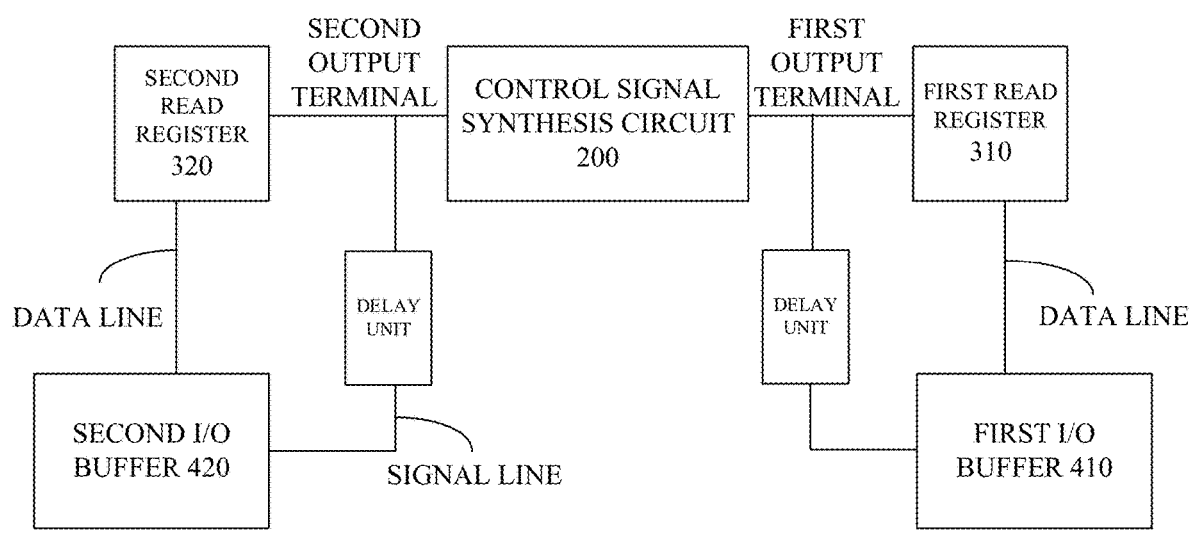
FIG. 13 is a schematic diagram illustrating inclusion of a delay unit and a first input/output buffer in an implementation of the present disclosure.

In some implementations, with reference to FIG. 13, a peripheral circuit further includes a delay unit and a first I/O buffer 410, wherein the delay unit has its input terminal connected with the first output terminal of the control signal synthesis circuit 200 and is configured to receive and delay the overall control signal to generate a delayed overall control signal; the first I/O buffer 410 is connected with the output terminals of the first read register 310 and the delay unit and configured to receive the delayed overall control signal and the read data output from the first read register 310, and then output the read data in the first I/O buffer 410 based on the delayed overall control signal.

In an implementation of the present disclosure, the data in the first read register 310 may be further stored in the first I/O buffer 410, and a set of read data may be converted into 8-bit I/O data for the pad region and output to outside (e.g., a host) based on the delayed overall control signal.

In some implementations, with reference to FIG. 13, the peripheral circuit may further include a delay unit and a second I/O buffer 420. The delay unit has its input terminal connected with the second output terminal of the control signal synthesis circuit 200 and is configured to receive and delay the overall control signal to generate a delayed overall control signal. The second I/O buffer 420 is connected with the output terminals of the second read register 320 and the delay unit, and configured to receive the delayed overall control signal and the read data output from the second read register 320 and then output the read data in the second I/O buffer 420 based on the delayed overall control signal.

In an implementation of the present disclosure, the data in the second read register 320 may be further stored in the second I/O buffer 420, and a set of read data may be converted into 8-bit I/O data for the pad region and output to outside (e.g., a host) based on the delayed overall control signal.

When the first I/O buffer 410 and the second I/O buffer 420 output data to outside simultaneously, I/O data of 16 bits can be output at one time.

Figure 14:
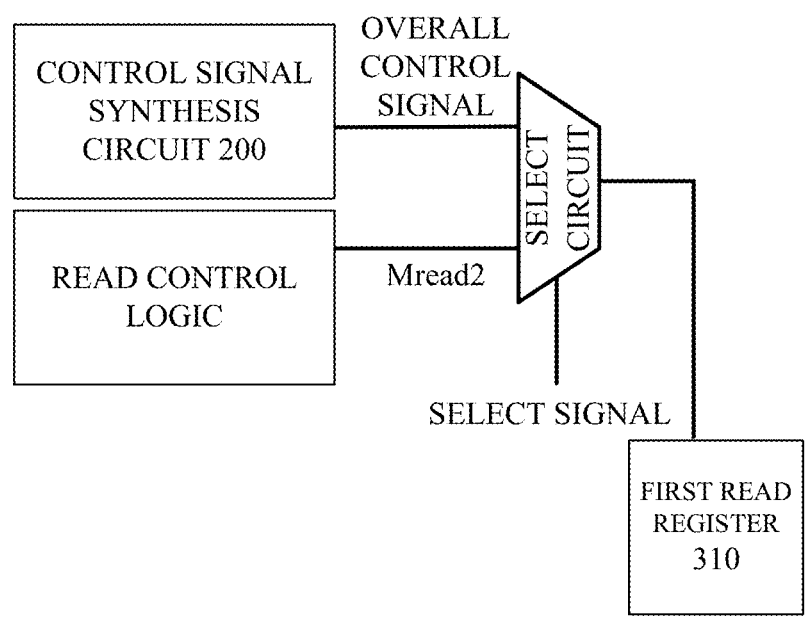
FIGS. 14 and 15 are schematic diagrams illustrating inclusion of a control signal synthesis circuit, a select circuit and a read control logic in implementations of the present disclosure.

In some implementations, with reference to FIG. 14, a peripheral circuit further includes a select circuit and a read control logic. The first input terminal of the select circuit is connected with the first output terminal of the control signal synthesis circuit 200, the second input terminal of the select circuit is connected with the read control logic, and the output terminal of the select circuit is connected with the first read register 310. The read control logic is configured to generate a timed sampling signal. The select circuit is configured to receive the overall control signal and the timed sampling signal and selectively output the overall control signal or the timed sampling signal according to a select signal.

The timed sampling signal in implementations of the present disclosure may be the second asynchronous sampling signal Mread2 in the implementation shown in FIG. 1.

Figure 15:
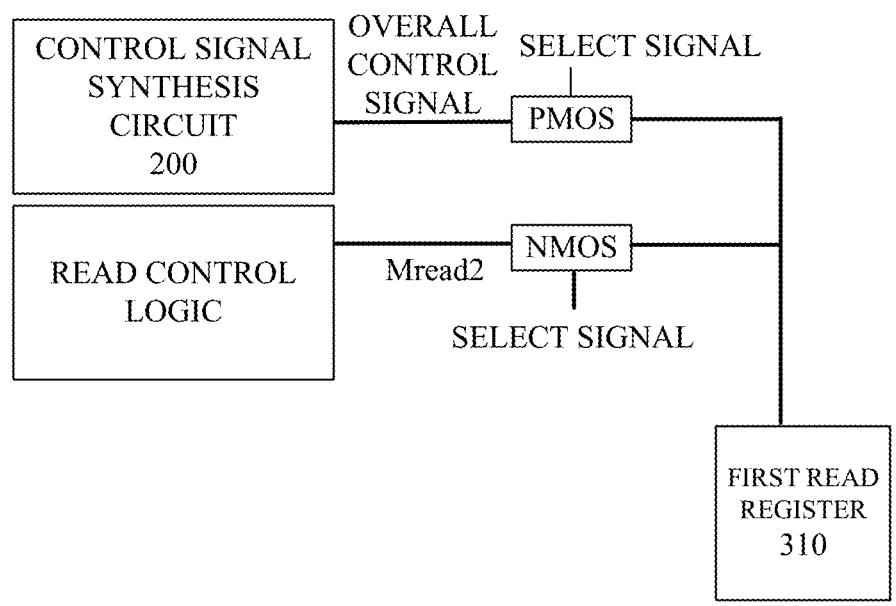

In an implementation of the present disclosure, as shown in FIG. 14, the select circuit may include a one-out-two data selector. As shown in FIG. 15, the select circuit may include a PMOS transistor and an NMOS transistor. The select signal is transferred respectively to the gate of the PMOS transistor and the gate of the NMOS transistor. When the select signal is of a first value, the select circuit outputs an overall control signal, and when the select signal is of a second value, the select circuit outputs the timed sampling signal. In some implementations, the first value may indicate a high level signal, and the second value may indicate a low level signal. In some other implementations, the first value may indicate a low level signal, and the second value may indicate a high level signal.

In the present disclosure, the solution shown in FIG. 1 and the solution shown in FIG. 4 may be combined, and when preset requirements about process corner, process, voltage and temperature of the memory are satisfied, it can be determined that the timed sampling signal Mread2 will not be shifted to the left or the right excessively, and the data stored in the first read register 310 may still be sampled correctly, so that the solution shown in FIG. 1 can be chosen and used. When preset requirements about process corner, process, voltage and temperature of the memory are not satisfied, it can be determined that the timed sampling signal Mread2 will be shifted to the left or the right excessively, and the data stored in the first read register 310 can not be sampled correctly, so that the solution shown in FIG. 4 can be chosen and used.

In some implementations, when the select circuit outputs an overall control signal, the first read register 310 is configured to receive the overall control signal and output read data therein based on the overall control signal; and when the select circuit outputs a timed sampling signal, the first read register 310 is configured to receive the timed sampling signal and output read data therein based on the timed sampling signal.

Implementations of the present disclosure further provide a memory system including a memory controller and a memory in accordance with any one of the implementations above, with the memory controller being configured to control the memory.

The memory and the memory system will be further described below in connection with FIGS. 16 to 19.

Figure 16:
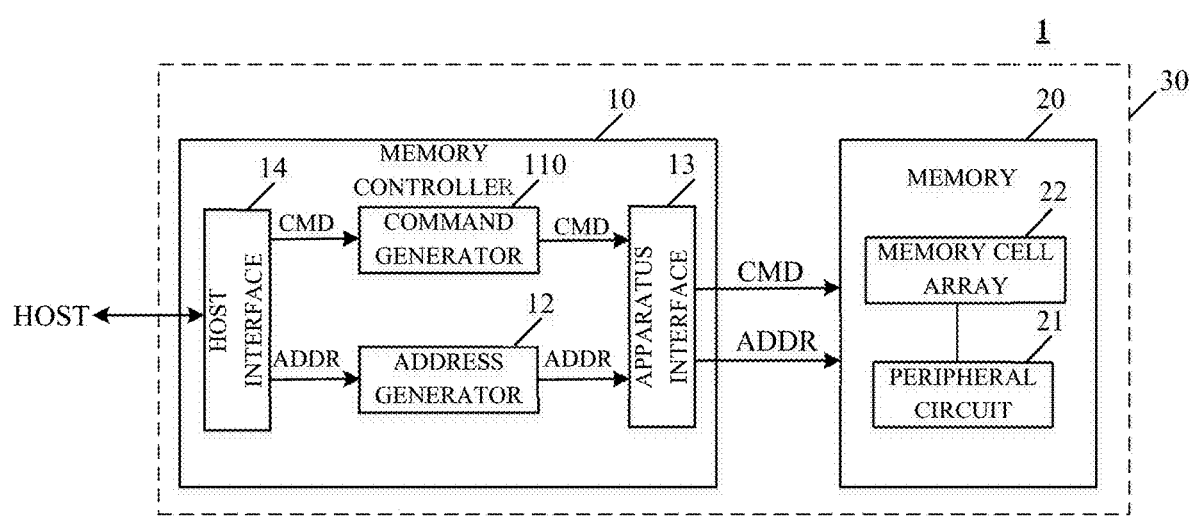
FIG. 16 is a schematic diagram of an example electronic apparatus including a memory system provided in an implementation of the present disclosure.

FIG. 16 illustrates a schematic block diagram of an example electronic apparatus in accordance with an implementation of the present disclosure. An electronic apparatus 1 may be a mobile phone, a desktop computer, a laptop computer, a tablet computer, a vehicle computer, a game console, a printer, a locating apparatus, a wearable electronic apparatus, a smart sensor, a virtual reality (VR) apparatus, an augmented reality (AR) apparatus, or any other suitable electronic apparatus having a storage therein. As shown in FIG. 16, the electronic apparatus 1 may include a host and a memory system 30 that includes a memory controller 10 and one or more memories 20. The host may be a processor (e.g., a central processing unit (CPU)) or a graphic processing unit (GPU) of the electronic apparatus. The host may be configured to send data to or receive data from the memory 20. The memory controller 10 is coupled to the memory 20 and the host, and is configured to control the memory 20. The memory controller 10 may manage the data stored in the memory 20 and communicate with the host.

The memory controller 10 may be configured to control operations of the memory 20, for example, read, erase, write and refresh operations. In some implementations, the memory controller 10 is further configured to process an error correction code (ECC) with respect to the data read from or written to the memory 20. Any other suitable functions can be performed by the memory controller 10 as well, for example, formatting the memory 20.

In some example implementations, the memory controller 10 and the one or more memories 20 may be integrated into various types of electronic apparatuses. For example, the memory controller 10 may be integrated into a northbridge in the main board of a computer or directly into the CPU of the computer, and a plurality of memories 20 may be integrated into a memory module. That is, the memory system 30 can be implemented and packaged into different types of electronic end products.

The memory controller 10 may send data to or receive data from the host and may send commands CMD and addresses ADDR to the memory 20. The memory controller 10 may include a command generator 11, an address generator 12, an apparatus interface 13 and a host interface 14. The host interface 14 may receive commands CMD and addresses ADDR from the host. The command generator 11 may generate access commands or the like by decoding the commands CMD received from the host and may provide access commands to the memory 20 through the apparatus interface 13. The access command may refer to a signal that instructs the memory 20 to access a row of a memory cell array 22 corresponding to the address ADDR so that data may be written or read. The address generator 12 in the memory controller 10 may generate row addresses and column addresses to be accessed in the memory cell array 22 by decoding the addresses ADDR received from the host interface 14. Moreover, the memory 20 may generate an address of a memory bank to be accessed when the memory cell array 22 includes a plurality of memory banks.

Moreover, the memory controller 10 may provide various signals to the memory 20 through the apparatus interface 13 for controlling memory operations, such as write and read operations. For example, the memory controller 10 may provide write commands to the memory 20. A write command is used to instruct the memory 20 to perform a write operation for storing data into the memory 20.

In some implementations, each memory 20 may include a memory cell array 22 and peripheral circuit 21. Here, the memory cell array 22 includes a plurality of memory banks, each memory bank includes a plurality of memory blocks, and each memory block includes multiple rows of memory cells and multiple columns of memory cells. Each row of memory cells is coupled with one corresponding word line, and each column of memory cells is coupled with one corresponding bit line. The peripheral circuit 21 may write data to or read data from the memory cell array 22 based on the commands CMD and addresses ADDR received from the memory controller 10, or provide, to a row decoder and a column decoder, a control signal CTRL for refreshing the memory cells included in the memory cell array 22. In other words, the peripheral circuit 21 may perform all the operations for processing the data in the memory cell array 22. The peripheral circuit 21 may include: a control circuit corresponding to each memory bank, such as a sense amplifier and a word line driver; a control circuit corresponding to each memory bank, such as a row decoder, a column decoder and the like; and a control circuit corresponding to all memory banks, such as a command cache, a command decoder, an address cache, an input/output cache, a mode register, and the like.

The memory 20 may be a random access memory (RAM), such as a dynamic random access memory (DRAM), a synchronous DRAM (SDRAM), a static RAM (SRAM), a double data rate SDRAM (DDR SDRAM), a DDR2 SDRAM, a DDR3 SDRAM, a phase change RAM (PRAM), a magnetic RAM (MRAM), a resistive RAM (RRAM), or the like. Only DRAM is taken as an example for the following description.

Figure 17:
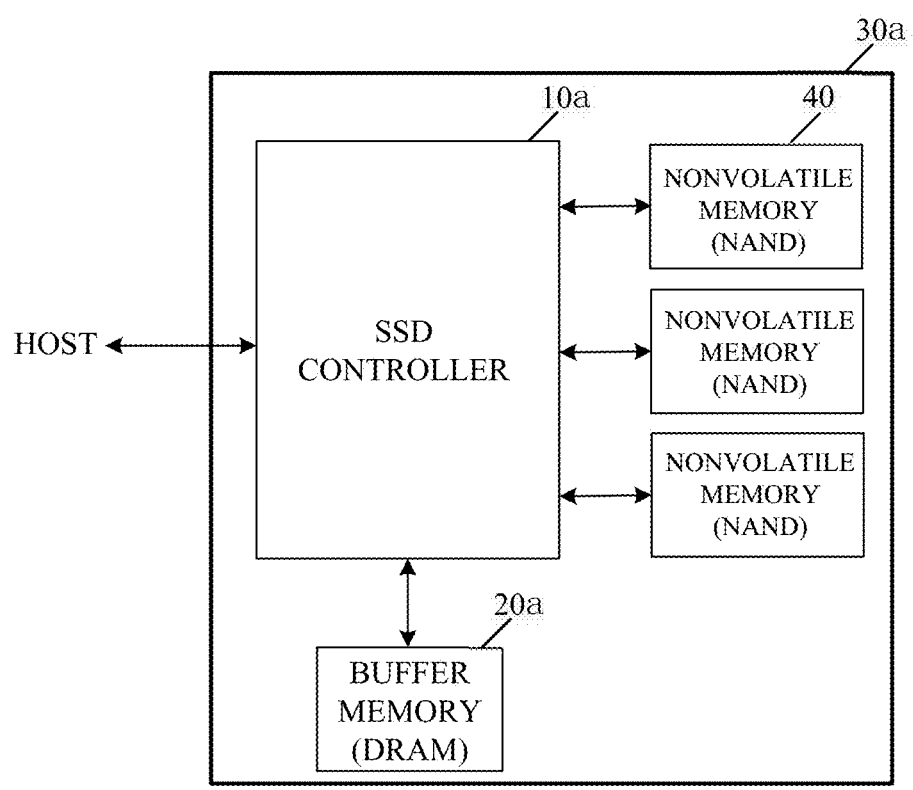
FIGS. 17 and 18 are schematic diagrams of a memory system provided in implementations of the present disclosure.

FIG. 17 is a schematic block diagram of an example solid state driver (SSD) in accordance with an implementation of the present disclosure. Here, the SSD can be understood as one type of the memory system shown in FIG. 16 and described above and, in this example, the DRAM may be used as a buffer memory.

As shown in FIG. 17, an SSD 30a may include an SSD controller 10a, a buffer memory 20a and a nonvolatile memory 40. The SSD controller 10a may provide a physical connection between the host and the SSD 30a. That is, the SSD controller 10a may provide an interface between the host and the SSD 30a according to the bus format of the host. The SSD controller 10a may decode the instructions provided from the host. The SSD controller 10a may access the nonvolatile memory 40 based on the result of the decoding. The buffer memory 20a may temporarily store the data to be written that is provided by the host, or the data read from the nonvolatile memory 40. When the host issues a read request, the buffer memory 20a may support the function of providing the cached data to the host directly if the data stored in the nonvolatile memory 40 is cached. The rate of transmitting data via the bus format (e.g., SATA or SAS) of the host is far higher than the rate of transmitting data through the memory channel of the SSD 30a. That is, when the rate of transmitting data through the interface of the host is significantly higher, the degradation of performance caused by the rate difference may be minimized by providing a high-capacity buffer memory 20a. Furthermore, the buffer memory 20a may store the address mapping table of the nonvolatile memory 40. The buffer memory 20a may include, but not limited to, a DRAM. The nonvolatile memory 40 may be configured as the memory medium of the SSD 30a. The nonvolatile memory 40 may include, but not limited to, an NAND memory.

Figure 18:
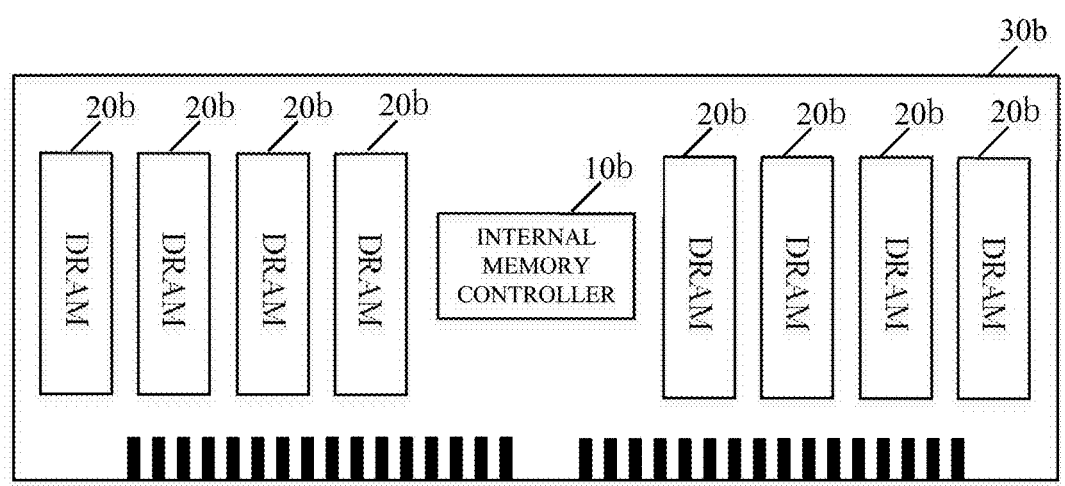

FIG. 18 is a schematic block diagram of an example internal memory in accordance with an implementation of the present disclosure. Here, the internal memory may be understood as one type of the memory system shown in FIG. 16 and described above, and in this example, a DRAM may be used as a memory medium.

As shown in FIG. 18, an internal memory 30b may be easily attached or mounted to an electronic apparatus 1 via an interface shown or detached from the electronic apparatus 1. The internal memory 30b may include a plurality of volatile memories 20b (e.g., DRAM) and an internal memory controller 10b. The internal memory 30b of a memory module may be configured to write, store, obtain (or read) and/or erase data under the control of the processor of a computer. In some implementations, the internal memory controller 10b may communicate with a DRAM using at least one communication protocol or technical standard associated with, for example, a dual in-line memory module (DIMM), a registered DIMM (RDIMM), a low load DIMM (LRDIMM), an unregistered DIMM (UDIMM), or the like.

It is to be noted that the buffer memory 20a in FIG. 17 and the nonvolatile memory 20b in FIG. 18 are both application scenarios of the memory 20 in FIG. 16.

Figure 19:
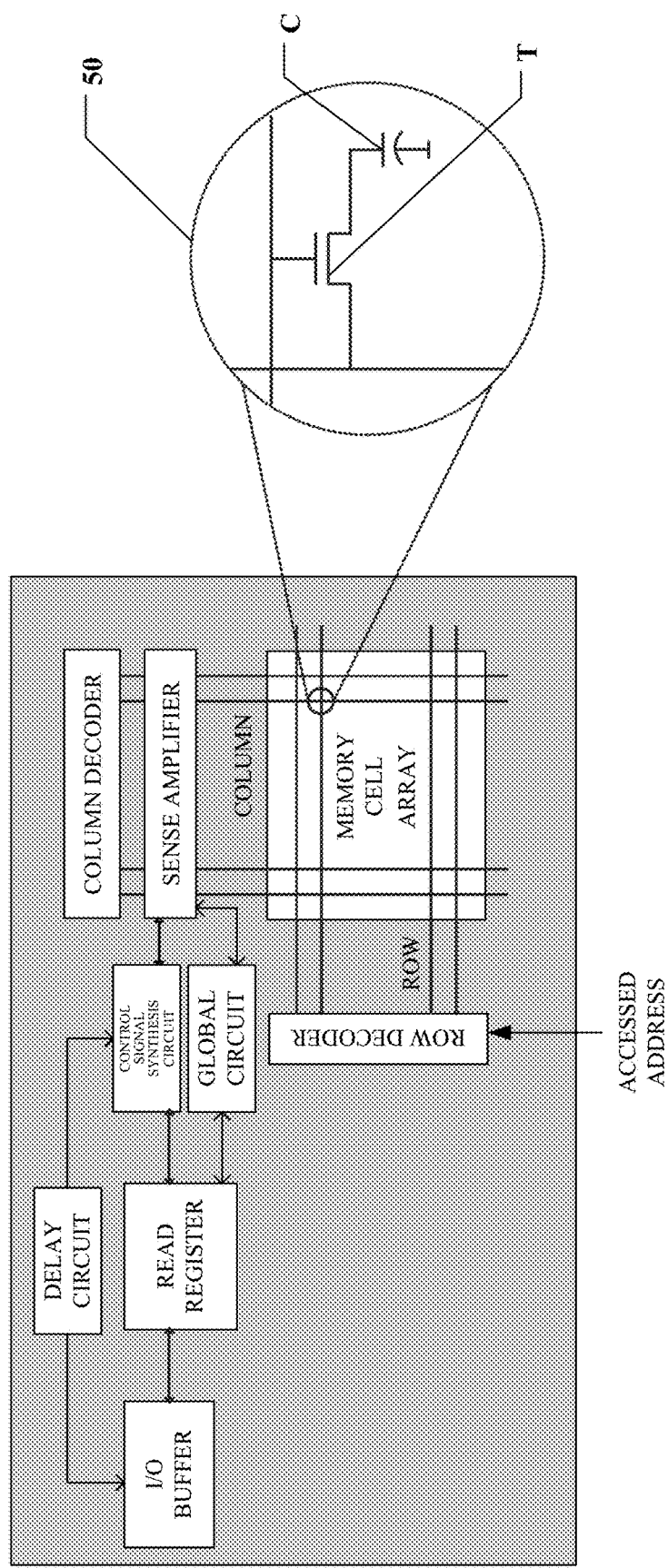
FIG. 19 is a schematic diagram illustrating inclusion of a peripheral circuit and a memory cell array in an implementation of the present disclosure.

A circuit of a memory cell of a DRAM is shown on the right in FIG. 19. The DRAM includes at least one DRAM die, and each DRAM die includes a memory cell array, in which a plurality of memory cells 50 are included and arranged in an array. Each memory cell 50 includes a transistor T and a capacitor C, and functions mainly with the principle of representing a binary bit of 1 or 0 by the amount of charges stored in the capacitor. The memory cells are arranged in an array and may be considered as a typical grid structure. In the memory cell array, an address is specified by using a row and a column. The memory controller can separately access individual memory cells of the DRAM die and perform read, write or refresh operation on the data stored therein by specifying an intersection of a row and a column (by specifying a row address and a column address of the DRAM).

The memory cell array and partial peripheral circuit of a DRAM are shown on the left in FIG. 19. It is to be noted that a row decoder selects a word line and thus a row of memory cells to be accessed in response to an address input to the row decoder. The row decoder decodes the input address and enable (activate) the word line corresponding to the decoded address. A column decoder selects a bit line and thus a column of memory cells to be accessed in response to an address input to the column decoder. Specific functions of the control signal synthesis circuit, global circuit, read registers (including a first read register and a second read register), I/O buffers (including a first I/O buffer and a second I/O buffer) and delay circuit in the peripheral circuit can be seen from the implementations above, and will not be described repeatedly here.

Figure 20:
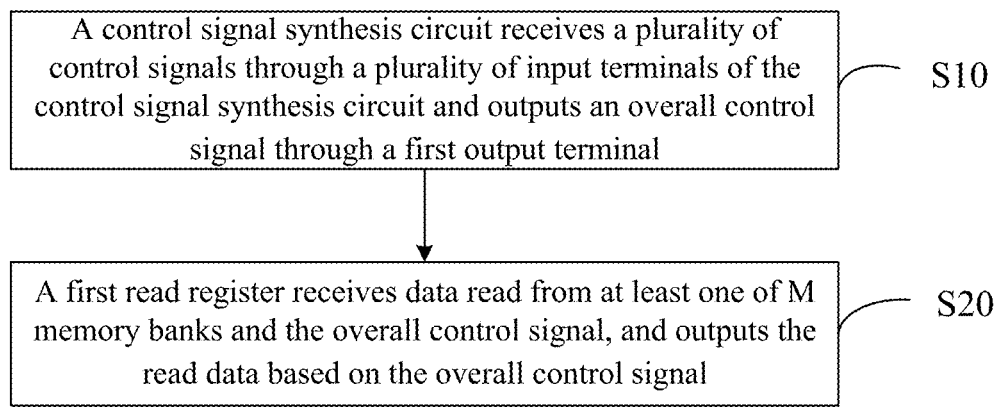
FIG. 20 is a schematic flow chart of a method of operating a memory provided in an implementation of the present disclosure.

Implementations of the present disclosure further provide a method of operating a memory including M memory banks and a peripheral circuit. M is an integer larger than 1. The peripheral circuit includes a control signal synthesis circuit and a first read register. The control signal synthesis circuit includes a plurality of input terminals, each of which is connected with one corresponding memory bank. The first input terminal of the control signal synthesis circuit is connected with the first read register. A path from each input terminal to the first output terminal in the control signal synthesis circuit has the same length. With reference to FIG. 20, the method includes the following processes.

At process S10, the control signal synthesis circuit receives a plurality of control signals through the plurality of input terminals of the control signal synthesis circuit and outputs an overall control signal through the first output terminal.

At process S20, the first read register receives data read from at least one of the M memory banks and the overall control signal and outputs the read data based on the overall control signal.

In implementations of the present disclosure, the control signal synthesis circuit is disposed between the plurality of memory banks and the first read register, and has a plurality of input terminals IN configured to receive a plurality of control signals and a first output terminal to output an overall control signal. Since the length of the path from each input terminal to the first output terminal in the control signal synthesis circuit is the same, the control signals corresponding to different memory banks can all arrive at the first read register at the same time, so that the read data received by the first read register can be sampled neither too early nor too late by the overall control signal. Also, during transferring the data read from the memory banks to the first read register, each stage of circuits that the data passes through is provided with a sampling signal, ensuring that the data can be sampled correctly at each stage.

In some implementations, a memory includes a plurality of bank groups, each of which includes N memory banks. The plurality of bank groups are arranged in a first direction. N is an integer smaller than M. The control signal synthesis circuit includes m stages of synthesis units with m being an integer larger than or equal to 1. Receiving the plurality of control signals through the plurality of input terminals of the control signal synthesis circuit and outputting the overall control signal through the first output terminal by the control signal synthesis circuit includes: synthesizing (k−1)th control signals, which are generated through synthesis respectively by two (k−1)th-stage synthesis units adjacent in the first direction, into a kth control signal through a kth-stage synthesis unit by the control signal synthesis circuit. K is an integer larger than 1 and smaller than or equal to m. Here, the mth control signal is an overall control signal.

In some implementations, each memory bank includes a first sub memory bank and a second sub memory bank. The control signal corresponding to each memory bank includes a first sub control signal corresponding to the first sub memory bank and a second sub control signal corresponding to the second sub memory bank. Each first-stage synthesis unit includes a first sub synthesis unit, a second sub synthesis unit and a third sub synthesis unit. Synthesizing the control signals corresponding respectively to the 2N memory banks in adjacent bank groups into a first control signal through the first-stage synthesis units by the control signal synthesis circuit includes: synthesizing the first sub control signals corresponding respectively to N first sub memory banks in a bank group into a third sub control signal through the first sub synthesis unit and synthesizing the second sub control signals corresponding respectively to N second sub memory banks in a bank group into a fourth sub control signal through the second sub synthesis unit by the control signal synthesis circuit; and synthesizing the third sub control signal and the fourth sub control signal corresponding to one bank group into the first control signal through the third sub synthesis unit by the control signal synthesis circuit.

In some implementations, each first-stage synthesis unit further includes a fourth sub synthesis unit, and synthesizing the control signals corresponding respectively to the 2N memory banks in adjacent bank groups into the first control signal through the first-stage synthesis units by the control signal synthesis circuit includes: synthesizing the first sub control signals corresponding respectively to N first sub memory banks in a bank group into a third sub control signal through the first sub synthesis unit and synthesizing the second sub control signals corresponding respectively to N second sub memory banks in a bank group into a fourth sub control signal through the second sub synthesis unit by the control signal synthesis circuit; synthesizing the third sub control signals, generated through synthesis respectively by two first sub synthesis units adjacent in the first direction, into a fifth sub control signal through the third sub synthesis unit and synthesizing the fourth sub control signals, generated through synthesis respectively by two second sub synthesis units adjacent in the first direction, into a sixth sub control signal through the third sub synthesis unit by the control signal synthesis circuit; and synthesizing the fifth sub control signal and the sixth sub control signal, generated through synthesis respectively by two third sub synthesis units adjacent in the first direction, into the first control signal through the fourth sub synthesis unit by the control signal synthesis circuit.

In some implementations, the peripheral circuit further includes a second read register, and the first read register and the second read register are disposed respectively on the two sides of the M memory banks in the first direction. The second output terminal of the control signal synthesis circuit is connected with the second read register. The path from each input terminal to the second output terminal in the control signal synthesis circuit has the same length. The method further includes: receiving the data read from at least one of the M memory banks and an overall control signal and outputting the read data based on the overall control signal by the second read register.

In some implementations, the peripheral circuit further includes a delay unit and a first I/O buffer. An input terminal of the delay unit is connected with the first output terminal of the control signal synthesis circuit, and the first I/O buffer is connected with the output terminals of the first read register and the delay unit. The method further includes: receiving and delaying an overall control signal to generate a delayed overall control signal by the delay unit; and receiving the delayed overall control signal and the read data output from the first read register and outputting the read data in the first I/O buffer based on the delayed overall control signal by the first I/O buffer.

In some implementations, the peripheral circuit further includes a select circuit and a read control logic. A first input terminal of the select circuit is connected with an output terminal of the control signal synthesis circuit, a second input terminal of the select circuit is connected with the read control logic, and an output terminal of the select circuit is connected with the first read register. The method further includes: generating a timed sampling signal by the read control logic; and receiving an overall control signal and the timed sampling signal and selectively outputting the overall control signal or the timed sampling signal according to a select signal by the select circuit.

In some implementations, receiving the overall control signal and the timed sampling signal and selectively outputting the overall control signal or the timed sampling signal according to the select signal by the select circuit includes: when the select circuit outputs the overall control signal, receiving the overall control signal and outputting the read data in the first read register based on the overall control signal by the first read register; or when the select circuit outputs the timed sampling signal, receiving the timed sampling signal and outputting the read data in the first read register based on the timed sampling signal by the first read register.

In view of this, implementations of the present disclosure provide a memory, an operation method thereof and a memory system.

In a first aspect, implementations of the present disclosure provide a memory including M memory banks. M is an integer greater than 1. A peripheral circuit includes a control signal synthesis circuit and a first read register. The control signal synthesis circuit includes a plurality of input terminals and a first output terminal. Each of the input terminals is connected with one corresponding memory bank and the first output terminal is connected with the first read register. The control signal synthesis circuit is configured to receive a plurality of control signals through the plurality of input terminals of the control signal synthesis circuit and output an overall control signal through the first output terminal. A path from each input terminal to the first output terminal in the control signal synthesis circuit has a same length. The first read register is configured to receive the overall control signal and data read from at least one of the M memory banks and output the read data based on the overall control signal.

In a second aspect, implementations of the present disclosure further provide a memory system including a memory controller and the memory in accordance with any one of the implementations above. The memory controller is configured to control the memory.

In a third aspect, implementations of the present disclosure further provide a method of operating a memory including M memory banks and a peripheral circuit. M is an integer greater than 1. The peripheral circuit includes a control signal synthesis circuit and a first read register, wherein the control signal synthesis circuit includes: a plurality of input terminals, each of which is connected with one corresponding memory bank; and a first output terminal connected with the first read register, wherein a path from each input terminal to the first output terminal in the control signal synthesis circuit has a same length. The method includes: receiving a plurality of control signals through the plurality of input terminals of the control signal synthesis circuit and outputting an overall control signal through the first output terminal by the control signal synthesis circuit; and receiving data read from at least one of the M memory banks and the overall control signal and outputting the read data based on the overall control signal by the first read register.

In implementations of the present disclosure, a control signal synthesis circuit is disposed between a plurality of memory banks and a first read register, and has a plurality of input terminals configured to receive a plurality of control signals and a first output terminal to output an overall control signal. Since a length of a path from each input terminal to the first output terminal in the control signal synthesis circuit is the same, the control signals corresponding to different memory banks can all arrive at the first read register at the same time, so that the read data received by the first read register can be sampled neither too early nor too late by the overall control signal. Also, during transferring the data read from the memory banks to the first read register, each stage of circuits that the data passes through is provided with a sampling signal, ensuring that the data can be sampled correctly at each stage.

For the methods in the implementations above, example implementations thereof have been described in detail in the implementations of the products corresponding to the methods, and will not be described repeatedly here.

Wherever no collisions will occur, the methods disclosed in the several method implementations provided by the present disclosure can be combined arbitrarily to obtain new method implementations.

Wherever no collisions will occur, the features disclosed in the several device implementations provided by the present disclosure can be combined arbitrarily to obtain new device implementations.

It can be understood that reference to "one implementation" or "an implementation" throughout the specification means that particular features, structures or characteristics in association with the implementation may be included in at least one implementation of the present disclosure. Therefore, "in one implementation" or "in an implementation" mentioned throughout the specification doesn't necessarily refer to the same implementation. Moreover, these particular features, structures or characteristics may be incorporated in one or more implementations in any suitable manner. It can be understood that, in various implementations of the present disclosure, the ordinal numbers as used in the various processes above are not intended to indicate that the processes must be performed in any sequential order, and the various processes should be performed in a sequential order as determined from the functions and inherent logic thereof. Process of implementations of the present disclosure is not limited in this respect. The ordinal numbers in the above-mentioned implementations of the present disclosure are only for the purpose of description and imply no preference for any one or more implementations over the others.

It is to be noted that, terms "include", "comprise" or any other variants thereof herein are intended to encompass non-exclusive inclusion such that a process, method, article or device including a series of elements includes not only those elements, but also other elements that have not been listed explicitly, or further includes elements inherent to the process, method, article or device. Without any further limitations, an element defined by expression "including a . . ." does not exclude additional identical elements in the process, method, article or device including the element.

What have been described above are only implementations of the present disclosure. However, the scope of the present disclosure is not limited thereto, and variations or substitutions that easily occur to those skilled in the art in light of the technical contents disclosed by the present disclosure will fall within the scope of the present disclosure. Therefore, the scope of the present disclosure should be determined by the scope of the claims.

What is claimed is:

1. A memory, comprising:
   M memory banks with M being an integer greater than 1; and
   a peripheral circuit comprising a control signal synthesis circuit and a first read register, wherein
   the control signal synthesis circuit comprises input terminals and a first output terminal, each of the input terminals is connected with one corresponding memory bank, the first output terminal is connected with the first read register, and the control signal synthesis circuit is configured to receive control signals through the input terminals of the control signal synthesis circuit, and output an overall control signal through the first output terminal, and a path from each input terminal to the first output terminal in the control signal synthesis circuit has a same length; and
   the first read register is configured to receive the overall control signal and data read from at least one of the M memory banks, and output the read data based on the overall control signal.

2. The memory of claim 1, wherein the memory comprises bank groups, each of which comprises N memory banks, and the bank groups are arranged in a first direction with N being an integer smaller than M.

3. The memory of claim 2, wherein the control signal synthesis circuit comprises m stages of synthesis units with m being an integer larger than or equal to 1; and
   the control signal synthesis circuit is configured to generate an mth control signal through synthesis by an mth-stage synthesis unit, and the mth control signal is the overall control signal.

4. The memory of claim 3, wherein the control signal synthesis circuit comprises a first-stage synthesis unit, which comprises the input terminals, and
   the control signal synthesis circuit is configured to synthesize, by the first-stage synthesis unit, control signals corresponding respectively to 2N memory banks in adjacent bank groups into a first control signal.

5. The memory of claim 3, wherein the control signal synthesis circuit is configured to synthesize, by a kth-stage synthesis unit, (k−1)th control signals, which are generated through synthesis respectively by two (k−1)th-stage synthesis units adjacent in the first direction, into a kth control signal with k being an integer larger than 1 and smaller than or equal to m.

6. The memory of claim 5, wherein the kth-stage synthesis unit is located on a mid-perpendicular line of the two (k−1)th-stage synthesis units adjacent in the first direction.

7. The memory of claim 6, wherein a path for each of the (k−1)th control signals to be transferred from the corresponding (k−1)th-stage synthesis unit to the kth-stage synthesis unit has a same length.

8. The memory of claim 4, wherein each of the 2N memory banks comprises a first sub memory bank and a second sub memory bank, the control signals corresponding to each of the 2N memory banks comprise first sub control signals corresponding to the first sub memory bank and second sub control signals corresponding to the second sub memory bank, and each of the first-stage synthesis unit comprises a first sub synthesis unit, a second sub synthesis unit, and a third sub synthesis unit.

9. The memory of claim 8, wherein the control signal synthesis circuit is configured to:
   synthesize, by the first sub synthesis unit, the first sub control signals corresponding respectively to N first sub memory banks in a bank group of the bank groups into a third sub control signal and synthesize, by the second sub synthesis unit, the second sub control signals corresponding respectively to N second sub memory banks in the bank group into a fourth sub control signal; and synthesize, by the third sub synthesis unit, the third sub control signal and the fourth sub control signal corresponding to one bank group into the first control signal.

10. The memory of claim 8, wherein each of the first-stage synthesis unit further comprises a fourth sub synthesis unit, and the control signal synthesis circuit is configured to:

synthesize, by the first sub synthesis unit, the first sub control signals corresponding respectively to N first sub memory banks in a bank group of the bank groups into a third sub control signal and synthesize, by the second sub synthesis unit, the second sub control signals corresponding respectively to N second sub memory banks in the bank group into a fourth sub control signal;

synthesize, by the third sub synthesis unit, the third sub control signals, generated through synthesis respectively by two first sub synthesis units adjacent in the first direction, into a fifth sub control signal, and synthesize, by the third sub synthesis unit, the fourth sub control signals, generated through synthesis respectively by two second sub synthesis units adjacent in the first direction, into a sixth sub control signal; and synthesize, by the fourth sub synthesis unit, the fifth sub control signal and the sixth sub control signal, generated through synthesis respectively by two third sub synthesis units adjacent in the first direction, into the first control signal.

11. The memory of claim 5, wherein a number of kth-stage synthesis units is one half of the number of the (k−1)th-stage synthesis units.

12. The memory of claim 3, wherein the m stages of synthesis units comprise OR gates.

13. The memory of claim 2, wherein the M memory banks are disposed on two sides of the peripheral circuit in a second direction, or the M memory banks are disposed on one side of the peripheral circuit in the second direction with the first direction being perpendicular to the second direction.

14. The memory of claim 2, wherein the peripheral circuit further comprises a second read register, and the first read register and the second read register are disposed respectively on two sides of the M memory banks in the first direction, a second output terminal of the control signal synthesis circuit is connected with the second read register, and a path from each of the input terminals to the second output terminal in the control signal synthesis circuit has a same length; and the second read register is configured to receive the read data from at least one of the M memory banks and the overall control signal and output the read data based on the overall control signal.

15. The memory of claim 1, wherein the peripheral circuit further comprises a delay unit and a first input/output (I/O) buffer;

the delay unit has an input terminal connected with the first output terminal of the control signal synthesis circuit, and is configured to receive and delay the overall control signal to generate a delayed overall control signal; and the first I/O buffer is connected with output terminals of the first read register and the delay unit, and is configured to receive the delayed overall control signal and the read data output from the first read register, and output the read data in the first I/O buffer based on the delayed overall control signal.

16. The memory of claim 1, wherein the peripheral circuit further comprises a select circuit and a read control logic, the select circuit has a first input terminal connected with the first output terminal of the control signal synthesis circuit, a second input terminal connected with the read control logic, and an output terminal connected with the first read register, wherein the read control logic is configured to generate a timed sampling signal; and the select circuit is configured to receive the overall control signal and the timed sampling signal and selectively output the overall control signal or the timed sampling signal according to a select signal.

17. The memory of claim 16, wherein:

when the select circuit outputs the overall control signal, the first read register is configured to receive the overall control signal and output the read data therein based on the overall control signal; or when the select circuit outputs the timed sampling signal, the first read register is configured to receive the timed sampling signal and output the read data therein based on the timed sampling signal.

18. A memory system comprising:

a memory controller; and a memory, comprising:

M memory banks with M being an integer greater than 1; and a peripheral circuit comprising a control signal synthesis circuit and a first read register, wherein the control signal synthesis circuit comprises input terminals and a first output terminal, each of the input terminals is connected with one corresponding memory bank, the first output terminal is connected with the first read register, and the control signal synthesis circuit is configured to receive control signals through the input terminals of the control signal synthesis circuit, and output an overall control signal through the first output terminal, and a path from each input terminal to the first output terminal in the control signal synthesis circuit has a same length; and the first read register is configured to receive the overall control signal and data read from at least one of the M memory banks, and output the read data based on the overall control signal, wherein the memory controller is configured to control the memory.

19. A method of operating a memory, wherein the memory comprises M memory banks and a peripheral circuit with M being an integer greater than 1, the peripheral circuit comprises a control signal synthesis circuit and a first read register, the control signal synthesis circuit comprises: input terminals, each of which is connected with one corresponding memory bank; and a first output terminal connected with the first read register, wherein a path from each input terminal to the first output terminal in the control signal synthesis circuit has a same length; and the method comprises:

receiving control signals through the input terminals of the control signal synthesis circuit and outputting an overall control signal through the first output terminal by the control signal synthesis circuit; and receiving data read from at least one of the M memory banks and the overall control signal and outputting the read data based on the overall control signal by the first read register.

20. The method of claim 19, wherein the memory comprises bank groups, each of which comprises N memory banks, the bank groups are arranged in a first direction, and N is an integer smaller than M, and the control signal synthesis circuit comprises m stages of synthesis units with m being an integer larger than or equal to 1; and receiving the control signals through the input terminals of the control signal synthesis circuit and outputting the overall control signal through the first output terminal by the control signal synthesis circuit comprises:

synthesizing control signals corresponding respectively to 2N memory banks in adjacent bank groups into a first control signal through a first-stage synthesis unit by the control signal synthesis circuit; and synthesizing (k−1)th control signals, which are generated through synthesis respectively by two (k−1)th-stage synthesis units adjacent in the first direction, into a kth control signal through a kth-stage synthesis unit by the control signal synthesis circuit, wherein k is an integer larger than 1 and smaller than or equal to m, and an mth control signal is the overall control signal.

* * * * *